(12) United States Patent
Mace et al.

(10) Patent No.: US 12,553,353 B2
(45) Date of Patent: Feb. 17, 2026

(54) PITCH-CHANGE MECHANISM WITH PITCH-LOCKING DEVICE COMPRISING A SATELLITE ROLLER SCREW

(71) Applicant: Safran Aircraft Engines, Paris (FR)

(72) Inventors: Jérôme Paul Marceau Mace, Moissy-Cramayel (FR); Christophe Marcel Lucien Perdrigeon, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/877,599

(22) PCT Filed: Jun. 22, 2023

(86) PCT No.: PCT/FR2023/050944
§ 371 (c)(1),
(2) Date: Dec. 20, 2024

(87) PCT Pub. No.: WO2023/247907
PCT Pub. Date: Dec. 28, 2023

(65) Prior Publication Data
US 2025/0382888 A1    Dec. 18, 2025

(30) Foreign Application Priority Data

Jun. 22, 2022 (FR) .................................... 2206140
Oct. 28, 2022 (FR) .................................... 2211296

(51) Int. Cl.
*F01D 7/00* (2006.01)
*B64C 11/34* (2006.01)
*B64C 11/38* (2006.01)

(52) U.S. Cl.
CPC ............... *F01D 7/00* (2013.01); *B64C 11/34* (2013.01); *B64C 11/385* (2013.01)

(58) Field of Classification Search
CPC ..... B64C 11/385; B64C 11/38; B64C 11/325; F01D 7/00
See application file for complete search history.

(56) References Cited

U.S. PATENT DOCUMENTS 3,884,090 A * 5/1975 Dock ........................ D01F 2/10
74/441
4,753,572 A    6/1988 Kusiak
(Continued)

FOREIGN PATENT DOCUMENTS

EP    0 168 942 A1    1/1986
EP    0 275 504 B1    12/1987
(Continued)

*Primary Examiner* — Courtney D Heinle
*Assistant Examiner* — Behnoush Haghighian
(74) *Attorney, Agent, or Firm* — BIRCH, STEWART, KOLASCH & BIRCH, LLP

(57) ABSTRACT

The invention relates to a pitch-change mechanism (70) which comprises a frame (72), a moving part (102) which can be translated along a longitudinal axis (X), and a locking device (160). The locking device (160) comprises a support member (162) which is translatable along the longitudinal axis (X) between an operating position and a locked position, and a screw-nut system (164). The screw-nut system (164) is formed by a system of satellite roller screws (195) comprising a screw (176) which is translatably secured to the support member (162) and rotatably mounted about the longitudinal axis (X), and a nut (178) which is secured to the moving part (102). The screw (176) has an abutment surface (186) which is separated from the frame (72) when the support member (162) is in the operating position and bears against the frame (72) when the support member (162) is in the locked position.

20 Claims, 10 Drawing Sheets

(56) References Cited

U.S. PATENT DOCUMENTS

| | | | | |
|---|---|---|---|---|
| 4,884,466 | A * | 12/1989 | Duruisseau | F16H 25/2252 74/424.92 |
| 8,267,656 | B2 * | 9/2012 | Carvalho | B64C 11/385 416/165 |
| 8,545,178 | B2 * | 10/2013 | Perkinson | B64C 11/40 416/27 |
| 10,900,549 | B2 * | 1/2021 | Hoover | F16H 25/2252 |
| 2007/0212220 | A1 * | 9/2007 | Perkinson | B64C 11/303 416/27 |
| 2007/0212221 | A1 * | 9/2007 | Carvalho | B64C 11/385 416/46 |
| 2010/0150719 | A1 | 6/2010 | Waide et al. | |

FOREIGN PATENT DOCUMENTS

| | | |
|---|---|---|
| EP | 1 832 509 B1 | 10/2011 |
| EP | 2 906 834 B1 | 12/2019 |
| FR | 2 941 493 A1 | 7/2010 |
| FR | 3 098 268 B1 | 1/2021 |
| WO | WO 95/08860 A1 | 3/1995 |
| WO | WO 2017/118809 A1 | 7/2017 |

\* cited by examiner

PITCH-CHANGE MECHANISM WITH PITCH-LOCKING DEVICE COMPRISING A SATELLITE ROLLER SCREW

FIELD OF THE INVENTION

The present invention relates to the general field of turbomachines equipped with at least one fan equipped with variable-setting blades, and more particularly to the control of the orientation of the fan airfoils of these turbomachines.

A preferred field of application of the invention is that of unducted fan turbojet engines (better known as propfan, open fan, open rotor and unducted fan). However, the invention also applies to turboprops with one or more propulsive propellers.

TECHNOLOGICAL BACKGROUND

One of the avenues currently explored to improve the specific consumption of civil airplane engines consists of the development of unducted fan turbojet engines, such as the one described in document FR 2 941 493. These turbojet engines include a conventional turbine engine gas generator, one or more turbine stages of which drive one or more unducted fan(s) extending outside the nacelle of the engine.

The blades of this or these fan(s) are, as in the case of conventional turboprops, variable-setting blades, that is to say the angular position of these blades (called setting angle) can be modified during flight. As a reminder, the setting angle of a blade corresponds to the angle, in a plane orthogonal to the pivot axis of the blade, between the axis of rotation of the fan and the chord of the blade at 75% of the radius of the fan. It can vary from a value equal to 90°, corresponding to a position called "flat" position of the blade, to a value equal to 0°, corresponding to a position called "feather" position of the blade. It can also take a value strictly greater than 90°, typically substantially equal to 95°, corresponding to a position called "reverse" position of the blade.

As known, this modification of the setting angle during flight makes it possible to change the engine thrust and optimize the efficiency of the fan according to the speed of the aircraft. Indeed, the rpm of the fans is almost constant over all the operating phases, and it is the setting of the blades that varies the thrust. Thus, in the cruise flight phase, the blades are oriented so as to adjust the thrust by minimizing the power taken from the turbine shaft and the consumption and by optimizing the efficiency. Conversely, on takeoff, the blades are oriented so as to maximize the thrust in order to allow the airplane to accelerate and then take off.

A difficulty encountered with the variable-setting blades is that, in case of malfunction of the systems piloting their orientation, said blades tend, under their own centrifugal effect, to assume the flat position. However, a blade blocked in this position generates little resistive torque and risks causing the engine to overspeed, with potential risks of damaging the engine. In addition, a blade blocked in this position also risks generating excessive and unacceptable drag for the controllability of the airplane and/or its range in the case of diversion mission.

To overcome this difficulty, it is known to use safety systems able to return the blades to the feather position and/or to resist the displacement of the variable-setting blades towards the small pitches (that is to say towards the flat position) in case of failure of the airfoil orientation control system. Such systems are for example known from EP 1 832 509 and EP 3 400 169.

The safety system described in EP 1 832 509 uses a screw-nut system of the ball screw type coupled to a locking nut. In normal operation, the nut of the screw-nut system follows the displacements of the actuator controlling the orientation of the blades, thus causing the rotation of the screw about its axis, while the locking nut follows the thread of the screw without ever touching it (the tapping of the locking nut is designed so as to arrange a slight clearance with the thread of the screw). In case of malfunction of the airfoil orientation control system, the screw of the screw-nut system is immobilized (its rotation is blocked) and the locking nut engages with said screw, thus preventing the pivoting of the blades towards the small pitches.

However, this safety system is not entirely satisfactory. Indeed, to operate properly, it requires accurate and complex management of the clearances between the locking nut and the screw thread. It is also heavy and bulky.

DISCLOSURE OF THE INVENTION

One objective of the invention is to propose a simple system able to resist the displacement of a variable-setting blade towards small pitches. Other objectives are that this system is reliable, accurate, lightweight and of reasonable cost.

To this end, the invention relates, according to a first aspect, to a pitch change mechanism for adjusting an angular position of at least one variable-setting blade about a pivot axis of the blade, said pitch change mechanism comprising:
  a frame fixed relative to the pivot axis,
  a control actuator including a fixed part secured to the frame and a moving part movable in translation along a longitudinal axis relative to the fixed part between a retracted position and a deployed position,
  a link system linking the moving part to the variable-setting blade so as to convert the translation of the moving part along the longitudinal axis into a rotation of the variable-setting blade about the pivot axis, and
  a pitch locking device capable of blocking the translation of the moving part relative to the fixed part in at least one way,
  the pitch locking device comprising:
  a support member, movable in translation relative to the frame along the longitudinal axis between an operating position and a locking position,
  a biasing device biasing the support member towards its locking position,
  a holding device for holding the support member in its operating position under normal operating conditions, and
  a screw-nut system with:
    a screw secured in translation to the support member and movably mounted in rotation about the longitudinal axis relative to the support member, the screw having an abutment surface which is at a distance from the frame when the support member is in the operating position and bearing against the frame when the support member is in the locking position, and
    a nut secured to the moving part and coaxial with the screw, the nut cooperating with the screw so that a translation of the nut along the longitudinal axis causes the rotation of the screw about the longitudinal axis, in which the screw-nut system is formed by a satellite roller screw system.

According to particular embodiments of the invention, the pitch change mechanism also has one or more of the following characteristics, taken separately or in any technically possible combination(s):

- the link system comprises a first articulation secured to the moving part, a second articulation secured to the variable-setting blade, away from the pivot axis, and a link member linking the first articulation to the second articulation;
- the longitudinal axis is substantially orthogonal to the pivot axis;
- the satellite roller screw system is reversible;
- the control actuator comprises a first chamber containing a control fluid at a first pressure and a second chamber containing the control fluid at a second pressure, the pitch change mechanism comprises a pressure generator for bringing the control fluid to a third pressure higher than the first and second pressures and a pressure control unit for adjusting the first and second pressures by means of the third pressure, and the holding device comprises a counterbalancing actuator including a chamber supplied with control fluid at the third pressure to counterbalance the biasing of the biasing device;
- the frame comprises a stopper against which the abutment surface of the screw bears when the support member is in the locking position, the variable-setting blade is movable about its pivot axis between a flat position and a feather position, and the link system is configured so that a displacement of the moving part towards the stopper causes a rotation of the variable-setting blade towards the flat position;
- the satellite roller screw system comprises a plurality of rollers interposed between the screw and the nut, each roller being engaged with an outer thread of the screw and an inner tapping of the nut;
- each roller is secured in translation to the nut or to the screw;
- the satellite roller screw system is constituted by a recirculating satellite roller screw system or a satellite roller bearing screw system;
- the abutment surface is arranged at a downstream end of the screw, respectively at an upstream end;
- the control actuator comprises a cylinder forming one of the fixed part and of the moving part and a piston forming the other of the fixed part and of the moving part, the cylinder defining an inner cavity and the piston dividing said inner cavity into two fluidic chambers each containing a control fluid for controlling the displacement of the moving part relative to the fixed part;
- the cylinder is continuous;
- the fluidic chambers are contiguous;
- each fluidic chamber is defined at least in part by an outer peripheral surface of the frame;
- the fluidic chambers are closed at each of the longitudinal ends of the actuator;
- the pitch locking device is outside said fluidic chambers;
- the pitch change mechanism comprises a sealing fluidly isolating the fluidic chambers from the pitch locking device;
- one of the two fluidic chambers is in fluid communication with the interior of the casing, the control fluid constituting a lubricating fluid for the locking device;
- at least part of the pitch locking device extends longitudinally away from the actuator;
- the pitch locking device is longitudinally cantilevered relative to the frame;
- the pitch change mechanism comprises a ferrule linking the nut to the moving part of the actuator, said ferrule protruding longitudinally, in particular upstream, from the actuator;
- the locking device comprises a guide system guiding the support member relative to the frame, the control actuator and the guide system being disposed longitudinally on the same side, preferably a downstream side, of the nut;
- the pitch locking device comprises a casing secured to the nut and surrounding the nut, the screw and the support member;
- the casing at least partially defines an enclosure for circulation of a lubricating fluid for the pitch locking device;
- the casing comprises an inner cylinder carrying the nut on an inner face and cooperating with an outer cylinder secured to the frame so as to slide longitudinally inside the latter, the inner cylinder having at its periphery a sealing in contact with an inner face of the outer cylinder, the outer cylinder and the casing together defining an enclosure for circulation of a lubricating fluid for the locking device;
- the pitch change mechanism comprises a device for guiding the nut relative to the frame, said guide device including an inner cylinder secured to the nut and an outer cylinder secured to the frame, the inner cylinder cooperating with the outer cylinder so as to slide longitudinally inside the latter;
- the link system is capable of converting:
  - a translation of the moving part along the longitudinal axis in a first way into a rotation of the variable-setting blade about the pivot axis towards the flat position, and
  - a translation of the moving part along the longitudinal axis in a second way opposite to the first way into a rotation of the variable-setting blade about the pivot axis towards the feather position;
- the first articulation is disposed upstream, respectively downstream, of the second articulation, the first way going from upstream to downstream, respectively from downstream to upstream;
- the abutment surface is oriented in the first way;
- the support member moves from its operating position to its locking position by translation in the first way;
- the link member is constituted by a connecting rod;
- the variable-setting blade comprises a leading edge, a trailing edge and a chord linking the leading edge to the trailing edge, the second articulation being placed opposite to the trailing edge relative to a plane orthogonal to the chord and containing the pivot axis; and
- the frame comprises a stopper against which the abutment surface of the screw bears when the support member is in the locking position, the control actuator and the stopper being disposed longitudinally on the same side of the nut.

The invention also relates, according to a second aspect, to a fan rotor for a turbomachine comprising a hub and a plurality of variable-setting blades each pivotable relative to the hub about a specific pivot axis, the rotor further comprising a pitch change mechanism according to the first aspect for adjusting an angular position of each of the variable-setting blades about its respective pivot axis.

According to particular embodiments of the invention, the fan rotor also has one or more of the following characteristics, taken separately or in any technically possible combination(s):
- the link system of the pitch change mechanism comprises, for each of the variable-setting blades, a first articulation secured to the moving part, a second articulation secured to the variable-setting blade, away from the pivot axis, and a connecting rod linking the first articulation to the second articulation; and
- the longitudinal axis constitutes an axis of rotation of the rotor.

The invention also relates, according to a third aspect, to a turbomachine comprising a fan rotor according to the second aspect.

According to one particular embodiment of the invention, the turbomachine also has the following characteristic:
- the longitudinal axis constitutes an axis of elongation of the turbomachine.

The invention also relates, according to a fourth aspect, to an aircraft comprising at least one turbomachine according to the third aspect.

Finally, the invention relates, according to a fifth aspect, to a method for changing the pitch of the blades of a fan rotor for a turbomachine, each pivotable relative to a hub of the fan rotor about a specific pivot axis, said method comprising the adjustment of an angular position of each of said blades about its respective pivot axis by means of a pitch change mechanism according to the first aspect.

According to one particular embodiment of the invention, the method also has the following characteristic:
- the method comprises an additional step of locking the orientation of the blades by means of the pitch locking device.

BRIEF DESCRIPTION OF THE FIGURES

Other characteristics and advantages of the invention will appear upon reading the following description, given solely by way of example and with reference to the appended drawings, in which.

DETAILED DESCRIPTION OF ONE EXEMPLARY EMBODIMENT

Figure 1:
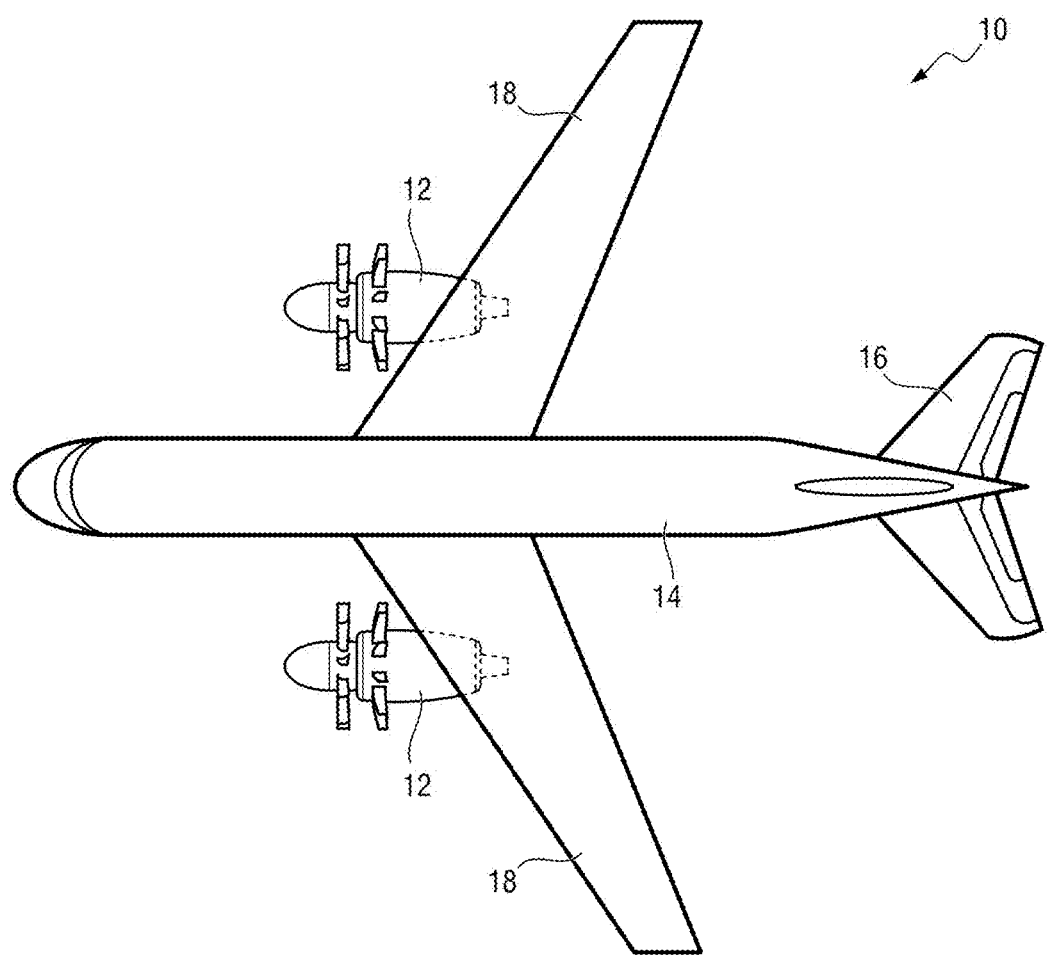
FIG. 1 is a top view of an aircraft according to one exemplary embodiment of the invention.

The aircraft 10 represented in FIG. 1 comprises turbomachines 12 to propel it.

In the example represented, the aircraft 10 is an airplane. It comprises, in a conventional manner, a fuselage 14, a tailplane 16 and two wings 18. The turbomachines 12 are here two in number and are each housed under a respective wing 18. As a variant (not represented), the turbomachines 12 are disposed along the fuselage 14, for example in the vicinity of the tailplane 16. As a further variant (also not represented), the aircraft 10 comprises a single turbomachine 12 or at least three turbomachines 12.

Figure 2:
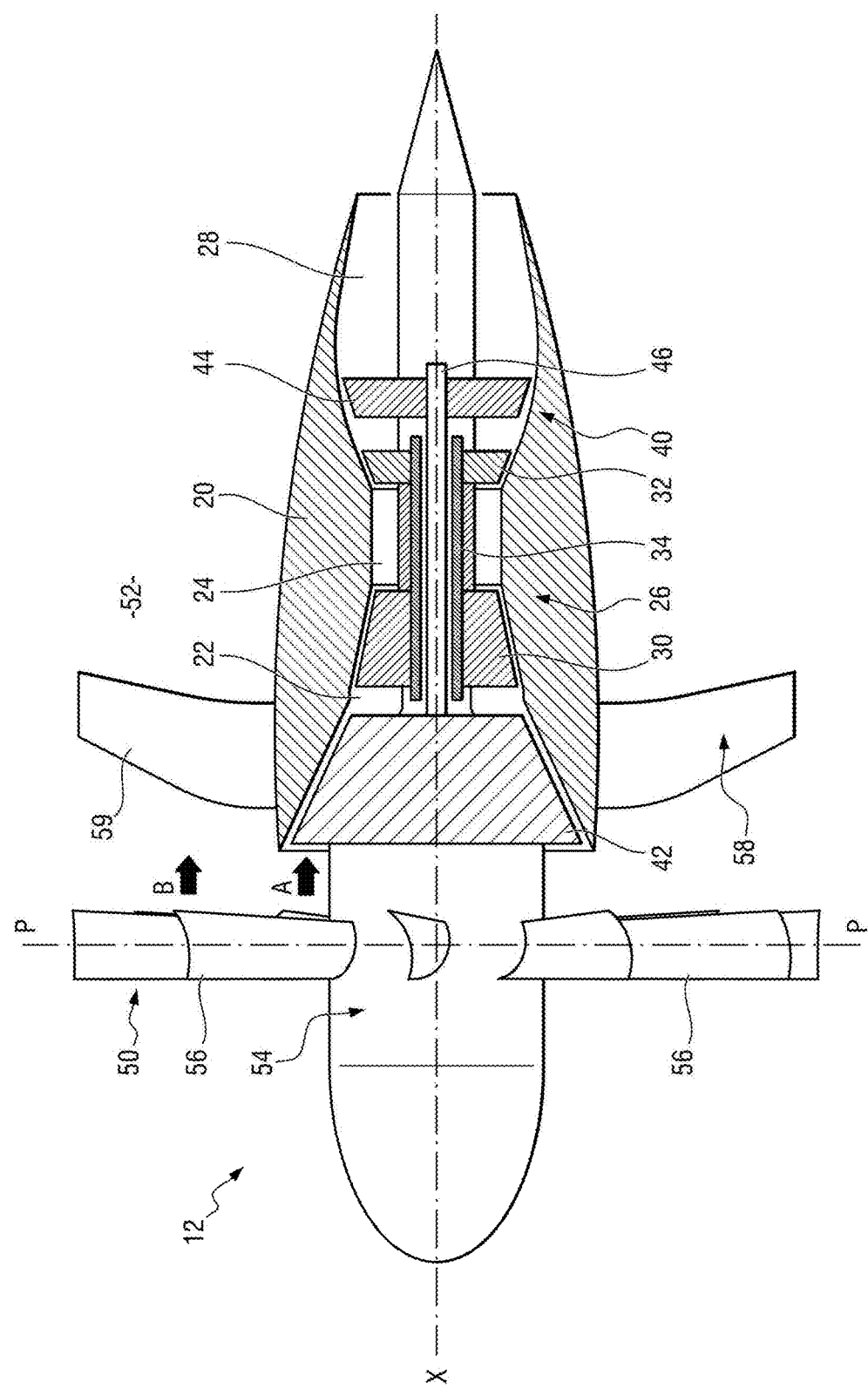
FIG. 2 is a simplified view in partial longitudinal section of a turbomachine of the aircraft of FIG. 1.

One of the turbomachines 12 is represented in FIG. 2.

As visible in this Figure, the turbomachine 12 is elongated along a longitudinal axis X. It typically has an angular symmetry about said longitudinal axis X, that is to say there is at least one angle for which the turbomachine is invariant by rotation about the longitudinal axis X.

Here and in the following, the terms "internal" and "external", "inner" and "outer", as well as their variations, are understood with reference to the axis X, an element described as "internal" or "inner" being oriented towards the axis X while an "external" or "outer" element is oriented opposite to the axis X.

The turbomachine 12 conventionally comprises a nacelle 20, an inner flowpath 22 for circulation of an air stream through the nacelle 20, a combustion chamber 24 housed in the flowpath 22, an engine body 26 and a gas exhaust nozzle 28.

Hereinafter, the terms "upstream" and "downstream" are understood with reference to a way of flow of an air stream through the flowpath 22.

The engine body 26 comprises a compressor 30, a turbine 32 and a transmission shaft 34 coupling the turbine 32 to the compressor 30 for the driving of the compressor 30 by the turbine 32. The compressor 30 is disposed upstream of the combustion chamber 24 and supplies the combustion chamber 24 with compressed air. The turbine 32 is disposed downstream of the combustion chamber 24 and receives the exhaust gases leaving the combustion chamber 24.

The transmission shaft 34 has the longitudinal axis X as axis of rotation.

The transmission shaft 34 is guided in rotation relative to the nacelle 20 by means of bearings (not represented).

In the example represented, the turbomachine 12 is a multi-spool in particular a two-spool turbomachine, comprising a low-pressure body 40 in addition to the engine body 26. The engine body 26 then constitutes a high-pressure body, the compressor 30 being a high-pressure compressor, the turbine 32 being a high-pressure turbine and the transmission shaft 34 being a high-pressure shaft.

The low-pressure body 40 comprises a low-pressure compressor 42, a low-pressure turbine 44 and a low-pressure shaft 46 coupling the low-pressure turbine 44 to the low-pressure compressor 42 for the driving of the low-pressure compressor 42 by the low-pressure turbine 44.

The low-pressure compressor 42 is disposed upstream of the high-pressure compressor 30 and supplies the latter with compressed air. The low-pressure turbine 44 is disposed downstream of the high-pressure turbine 32 and receives the exhaust gases leaving the latter.

The low-pressure shaft 46 is guided in rotation relative to the nacelle 20 by means of bearings (not represented).

The low-pressure shaft 46 is coaxial with the high-pressure shaft 34. It therefore also has the longitudinal axis X as axis of rotation. In particular, the low-pressure shaft 46 extends inside the high-pressure shaft 34.

The turbomachine 12 also comprises a fan 50 for driving the air stream in an outer circulation flowpath 52 surrounding the nacelle 20. A primary air stream A (hot) is thus distinguished, consisting of the portion of the air stream driven in the inner circulation flowpath 22, and a secondary air stream B (cold), consisting of the portion of the air stream driven in the outer circulation flowpath 52.

The fan 50 comprises a fan rotor 54. This fan rotor 54 is rotatably mounted relative to the nacelle 20 about the longitudinal axis X. It comprises a hub 55 (FIG. 3) provided with fan blades 56 extending substantially radially outward from the hub 55. These blades 56, when rotated, drive the air stream in the outer circulation flowpath 52.

Figure 8:
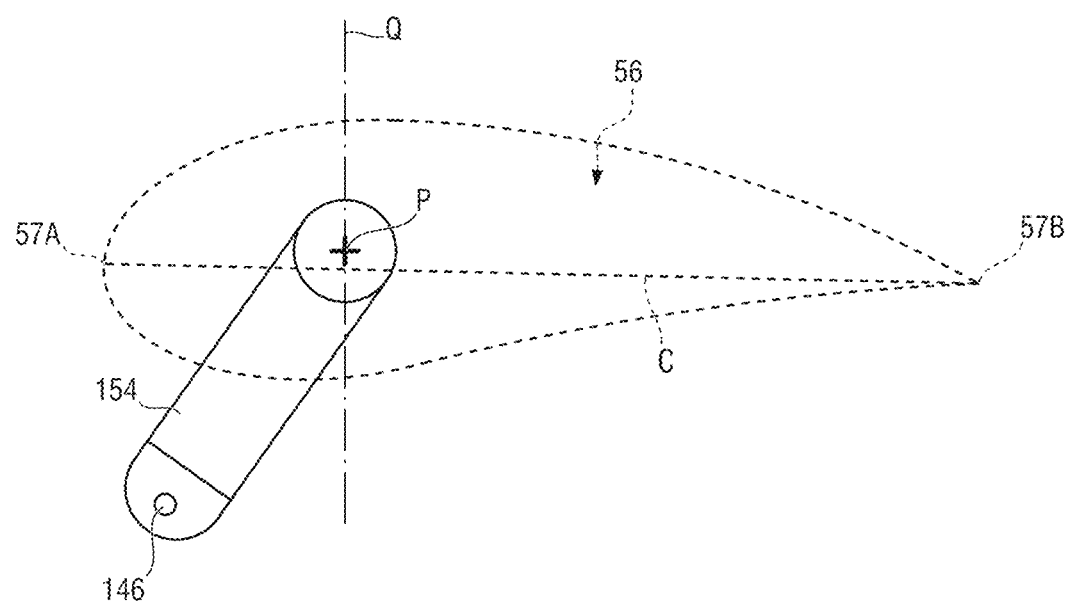
FIG. 8 is a simplified view along a radial axis of an arm for rotating a variable-setting blade of the turbomachine of FIG. 2.

As visible in FIG. 8, each blade 56 comprises a leading edge 57A, a trailing edge 57B and a chord C linking the leading edge 57A to the trailing edge 57B.

Returning to FIG. 2, the fan rotor 54 is driven in rotation by the low-pressure turbine 44, via the low-pressure shaft 46. In the example represented, this driving is direct, that is to say the fan rotor 54 is secured in rotation to the low-pressure shaft 46. As a variant (not represented), this driving is done via a reducer allowing the fan rotor 54 to rotate at a speed lower than that of the low-pressure shaft 46.

In the example represented, the fan 50 also comprises a fan stator 58 comprising vanes 59 arranged at the periphery of the nacelle 20, in the outer circulation flowpath 52, along a plane orthogonal to the longitudinal axis X. This fan stator 58 is here arranged downstream of the fan rotor 54. As a variant (not represented), the fan 50 comprises, instead of the fan stator 58, a counter-rotating fan rotor.

Advantageously, the fan 50 is, as represented, unducted, that is to say the outer circulation flowpath 52 has no peripheral delimitation. The turbomachine 12 is then constituted, as represented, by an unducted fan turbojet engine or, as a variant, by a turboprop. As a variant (not represented), the outer circulation flowpath 52 is defined between the nacelle 20 and a fan casing surrounding the fan 50; the turbomachine 12 is then typically constituted by a turbojet engine with a high bypass ratio, the bypass ratio being defined as the ratio of the flow rate of the secondary stream B (cold) to the flow rate of the primary stream A (hot).

In the example represented, the turbomachine 12 is in particular of the "puller" type, that is to say the fan 50 is disposed upstream of the inner circulation flowpath 22 and also drives the air stream in the latter. As a variant (not represented), the turbomachine is of the "pusher" type, that is to say the fan 50 is placed around the downstream half of the nacelle 20.

The blades 56 of the fan rotor 54 are variable-setting blades, that is to say each blade 56 is pivotally mounted relative to the hub 55 about a specific pivot axis P. This pivot axis P extends along the direction of elongation of the blade 56. It is orthogonal to the longitudinal axis X.

Each blade 56 is in particular able to pivot about the axis P relative to the hub 55 between a position called feather position, in which the chord C of the blade 56 is substantially parallel to the longitudinal axis X, and a position called flat position, in which the chord C of the blade 56 is substantially orthogonal to the longitudinal axis X. Preferably, each blade 56 is also able to pivot beyond the flat position, to a position called reverse position, in which the chord C of the blade 56 forms an angle strictly greater than 90°, for example substantially equal to 95°, with the longitudinal axis X. Since the blades 56 are most often twisted, the chord C taken as a reference for the measurement of the setting angle is, by convention, constituted by the chord of the blade at 75% of the radius of the fan rotor 54.

Figure 3:
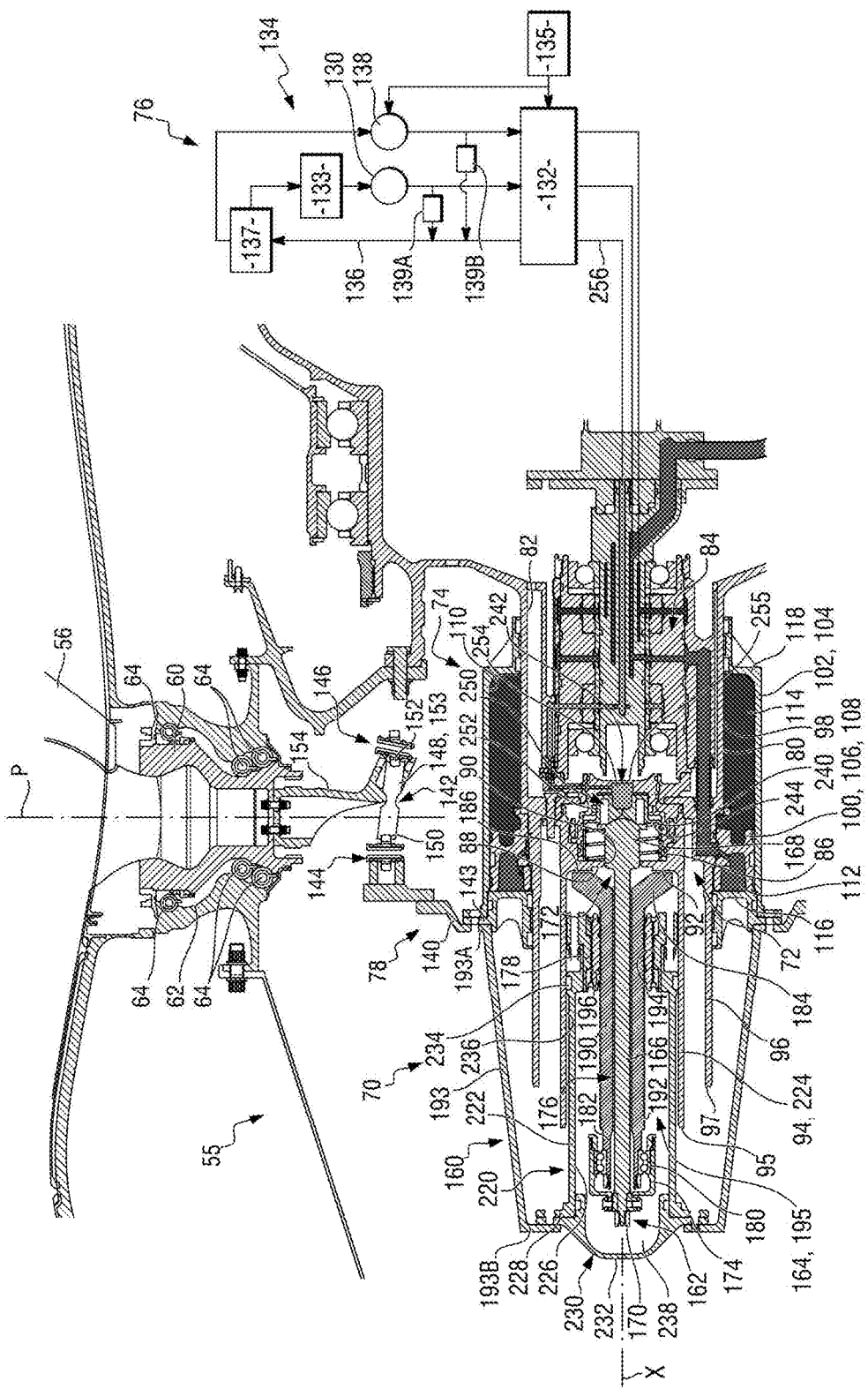
FIG. 3 is a simplified view in longitudinal section of part of a pitch change mechanism of the turbomachine of FIG. 2, according to a first embodiment, the pitch change mechanism being in a first configuration.

For this purpose, each blade 56 is secured, as visible in FIG. 3, to an attachment piece 60 disposed at the blade root. This attachment piece 60 is rotatably mounted relative to the hub 55 about the pivot axis P. More specifically, the attachment piece 60 is rotatably mounted inside a housing 62 arranged in the hub 55 by means of balls 64 or other rolling elements.

The fan 50 further comprises a pitch change mechanism 70 for adjusting the setting angle of each blade 56 about its pivot axis P so as to adapt the performance of the turbomachine 12 to the different flight phases.

A first embodiment of the pitch change mechanism 70 will now be described, with reference to FIGS. 3 to 9.

With reference to FIG. 3, the pitch change mechanism 70 comprises, in this first embodiment, a frame 72, a control actuator 74, a system 76 for piloting the actuator 74 and a link system 78.

The frame 72 is secured to the hub 55 and is typically constituted by part of the hub 55. It is thus fixed relative to the pivot axes P.

The frame 72 comprises a base 80. This base 80 is centered on the longitudinal axis X. Here, it is crossed by the pivot axes P.

In the example represented, the base 80 defines a housing 82 open downstream. This housing 82 is in particular cylindrical, typically cylindrical of revolution, and centered on the axis X. An oil transfer bearing 84 is received in said housing 82.

The base 80 also defines a cavity 86 opening out into an upstream face 88 of the base 80 through an orifice 90 which is here centered on the axis X. This cavity 86 is in particular cylindrical, typically cylindrical of revolution, and centered on the axis X. It is interposed between the upstream face 88 and the housing 82.

The base 80 has a stopper 92 oriented upstream. This stopper 92 is here formed by part of the upstream face 88. It extends substantially radially and is in particular arranged around the orifice 90.

In the example represented, the frame 72 also comprises a cylinder 94 protruding upstream from the base 80. This cylinder 94 is centered on the axis X and is open at its upstream end 95. It extends around the stopper 92. It is typically cylindrical of revolution.

Here, the frame 72 also comprises a peripheral cylinder 96, coaxial with the cylinder 94 and surrounding the latter, protruding upstream from the base 80. This cylinder 96 is open at its upstream end 97. It is typically cylindrical of revolution.

The base 80 and the peripheral cylinder 96 together define an outer peripheral surface 88 of the frame 72. This outer peripheral surface 88 is substantially cylindrical and centered on the axis X. It is oriented radially outwards.

Figure 5:
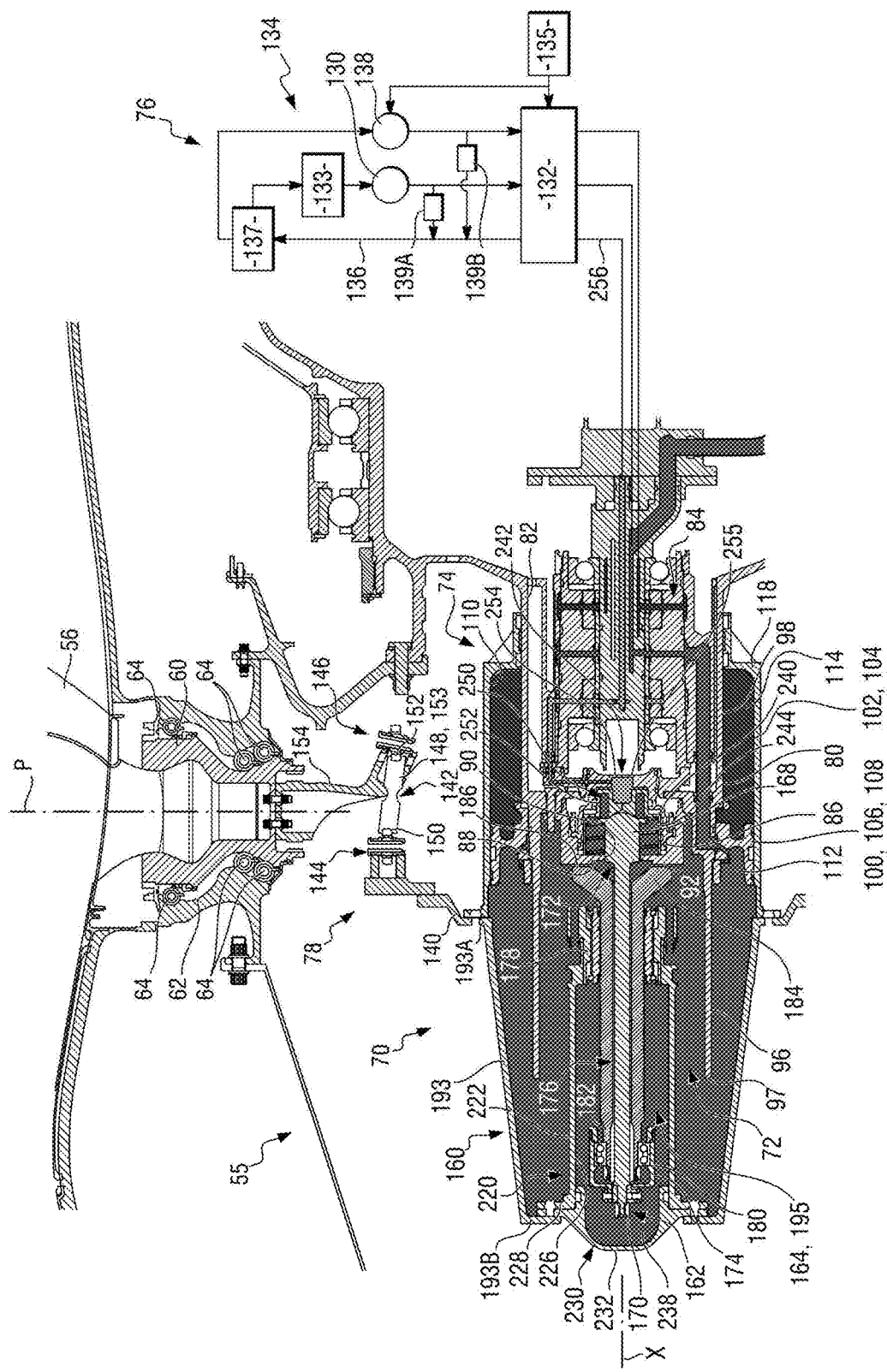
FIG. 5 is a view similar to that of FIG. 3 of a first variant of the pitch change mechanism of FIG. 3.

As a variant, as represented in FIG. 5, the frame 72 does not comprise the cylinder 94.

Figure 6:
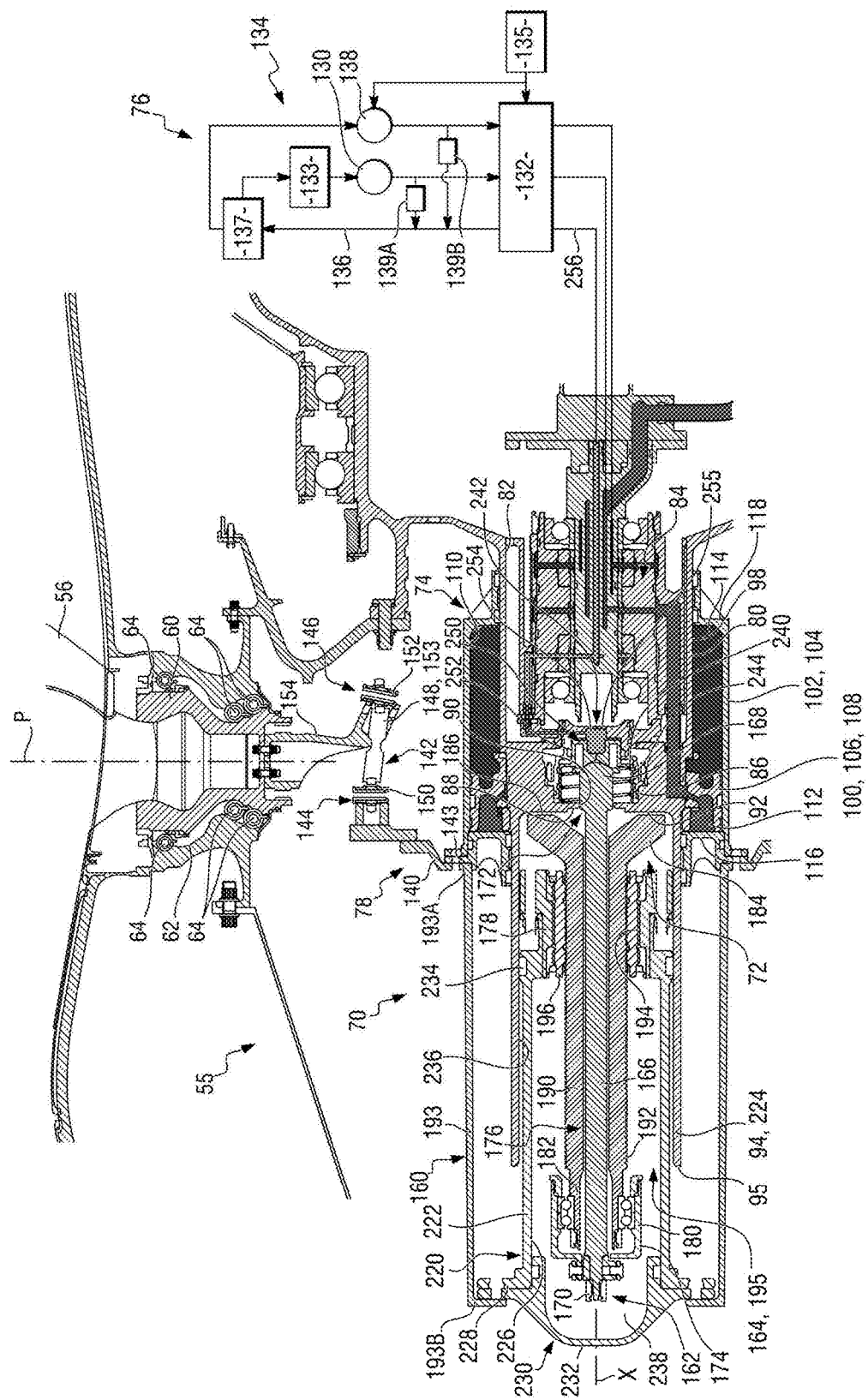
FIG. 6 is a view similar to that of FIG. 3 of a second variant of the pitch change mechanism of FIG. 3.

As another variant, as represented in FIG. 6, the frame 72 does not comprise the peripheral cylinder 96. The outer peripheral surface 88 is then defined by the base 80 and the cylinder 94.

Figure 4:
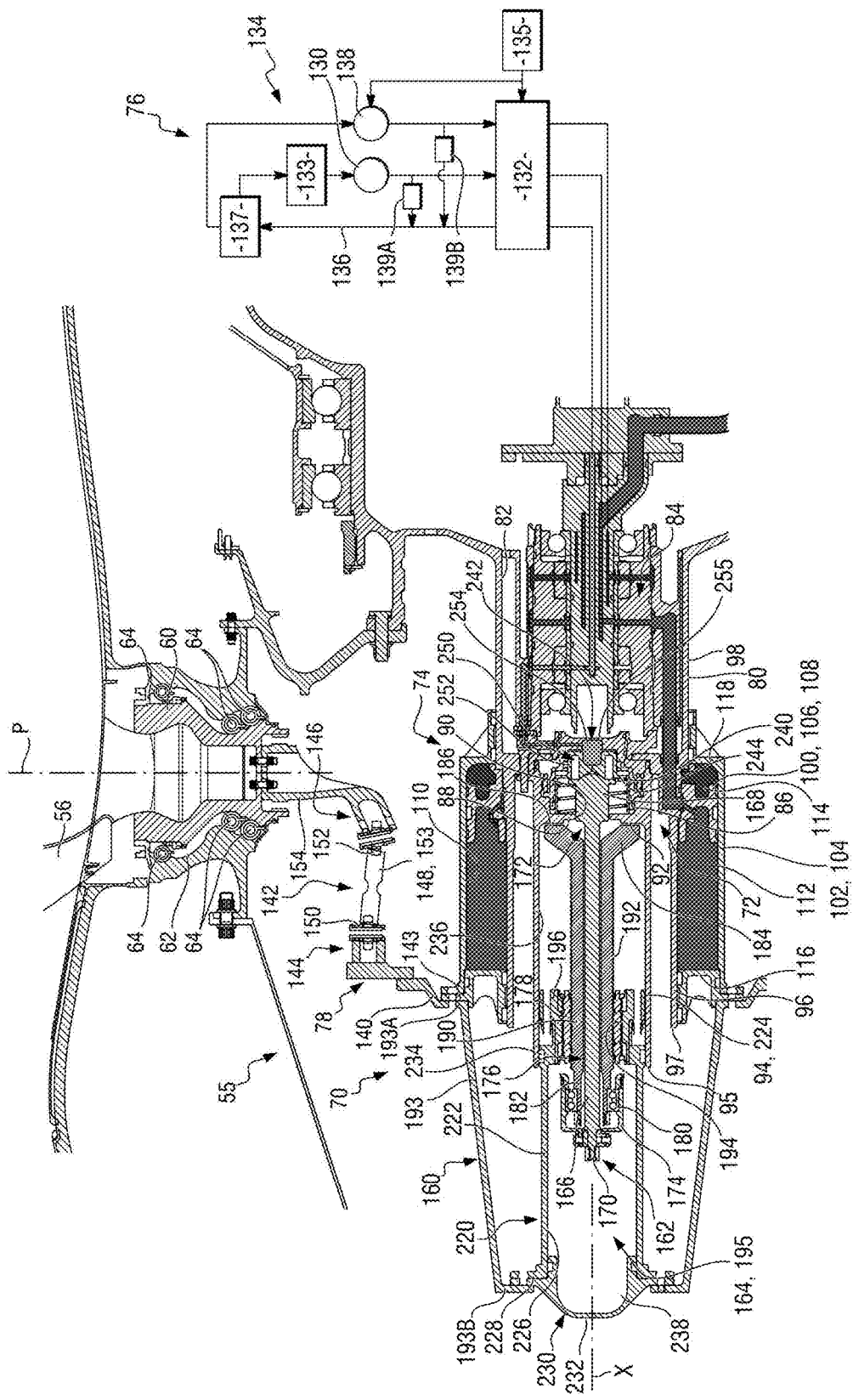
FIG. 4 is a view similar to that of FIG. 3, the pitch change mechanism being in a second configuration.

Returning to FIG. 3, the control actuator 74 includes a fixed part 100, secured to the frame 72, and a moving part 102 movable in translation along the longitudinal axis X relative to the fixed part 100 between a retracted position, represented in FIG. 3, and a deployed position represented in FIG. 4. Optionally, the moving part 102 is also movable in rotation about the longitudinal axis X over a restricted angle, for example of the order of 5°.

The control actuator 74 comprises in particular a continuous cylinder 104 forming one of the fixed part 100 and of the moving part 102 and a piston 106 forming the other of the fixed part 100 and of the moving part 102. Here, the cylinder 104 forms the moving part 102 and the piston 106 forms the fixed part 100.

Thus, in the example represented, the cylinder 104 extends around the outer peripheral surface 88 of the frame 72, coaxially with this surface, and the piston 106 is constituted by a collar 108 secured to the frame 72 extending radially outwards from the outer peripheral surface 88 to the cylinder 104.

The cylinder 104 defines an inner cavity 110. The piston 106 divides said inner cavity 110 into two contiguous fluidic chambers 112, 114. Each contains a control fluid, typically constituted by an oil, to control the displacement of the moving part 102 relative to the fixed part 100. This control fluid is at a first pressure in the first fluidic chamber 112 and at a second pressure in the second fluidic chamber 114. The first and second fluidic chambers 112, 114 are arranged so that the relative increase of the first pressure (that is to say relative to the second pressure) causes the displacement of the piston 110 towards its deployed position, the relative increase in the second pressure (that is to say relative to the first pressure) causing the displacement of the piston 110 towards its retracted position.

Here, each of the fluidic chambers 112, 114 is delimited internally by the outer peripheral surface 88 of the frame 72 and externally by the cylinder 104. The first fluidic chamber 112 is also delimited at its downstream end by the piston 106 and the second fluidic chamber 114 is delimited at its upstream end by the piston 106.

The control actuator 74 is thus particularly compact, which makes it possible to lighten it.

In the example represented in FIG. 3, the moving part 102 also comprises an upstream guide bushing 116 and a downstream guide bushing 118 each secured to the cylinder 104 and extending radially inward from the cylinder 104 to the outer peripheral face 88 of the frame 72. The upstream guide bushing 116 is disposed upstream of the piston 106 and defines an upstream end of the first fluidic chamber 112. The downstream guide bushing 118 is disposed downstream of the piston 106 and defines a downstream end of the second fluidic chamber 114.

In the example represented in FIG. 3, each of the upstream and downstream guide rings 116, 118 constitutes a sealing bushing and longitudinally closes the first fluidic chamber 112, respectively the second fluidic chamber 114. The fluidic chambers 112, 114 are thus closed at each of the longitudinal ends of the control actuator 74

Figure 7:
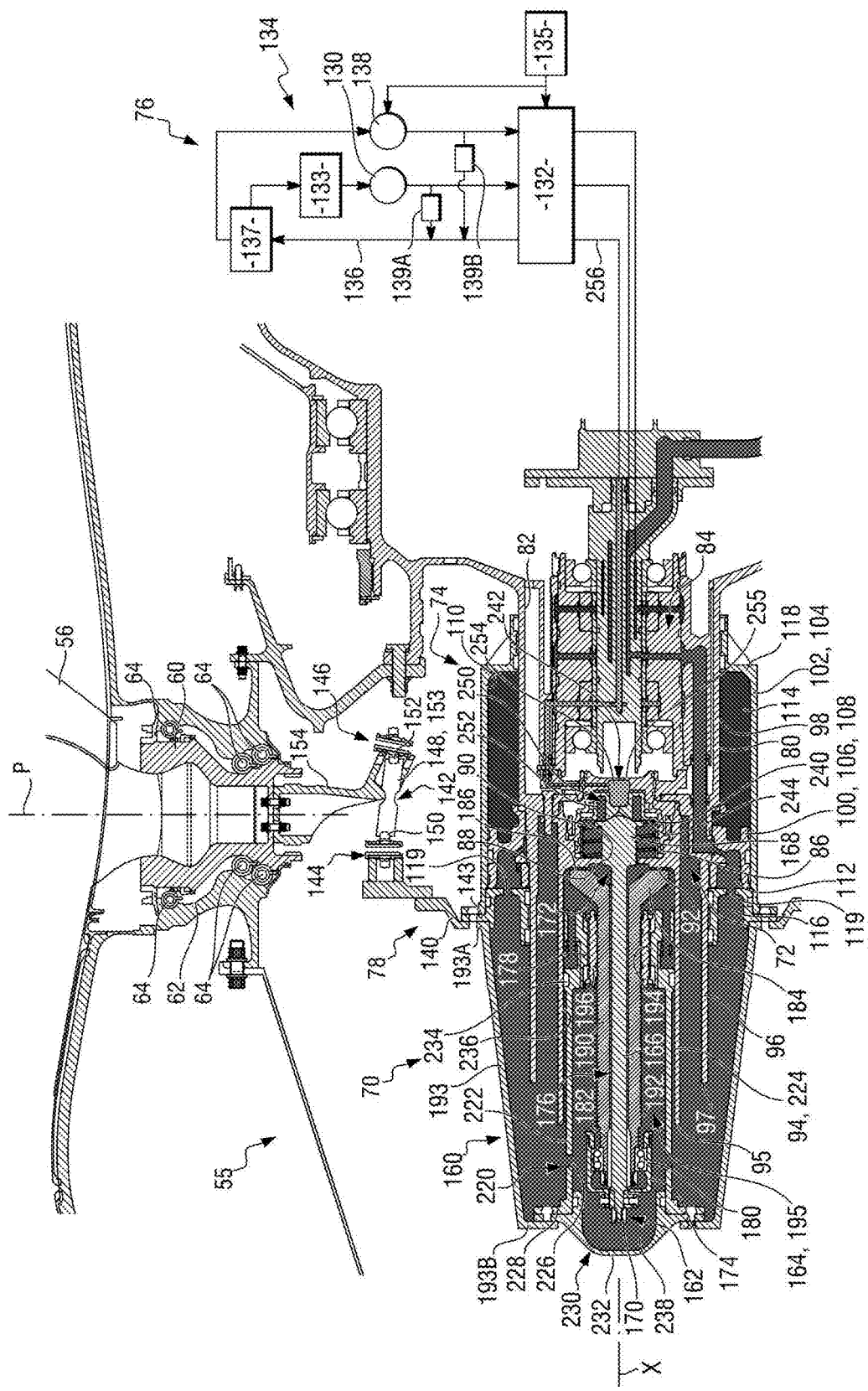
FIG. 7 is a view similar to that of FIG. 3 of a third variant of the pitch change mechanism of FIG. 3.

In a variant, as represented in FIG. 7, only the downstream guide bushing 118 constitutes a sealing bushing. The upstream guide bushing 118 has bores 119 allowing the control fluid to flow through the upstream guide bushing 118.

As another variant, as represented in FIG. 5, the moving part 102 does not comprise an upstream guide bushing 118.

Returning to FIG. 3, the piloting system 76 comprises a pressure generator 130 for bringing the control fluid to a third pressure higher than the first and second pressures, a pressure control unit 132 for adjusting the pressure of the control fluid in the first and second fluidic chambers 112, 114 by means of the third pressure, and a return line 136 for discharging the depressurized control fluid. The piloting system 76 also comprises a main tank 133, a backup circuit 134, and a control module 135.

The pressure generator 130 comprises, for example, a pump able to pump the fluid to bring it to the third pressure, for example 100 bars. A main pressure relief valve 139A allows discharging part of the control fluid to the return line 136 when the pressure of the control fluid downstream of the pressure generator 130 exceeds the third pressure.

The pressure control unit 132 is supplied with control fluid at the third pressure by the pressure generator 130. It is fluidly connected to the first fluidic chamber 112 and to the second fluidic chamber 114 via the oil transfer bearing 106. It is able to distribute the control fluid between the first fluidic chamber 112 and the second fluidic chamber 114 so as to adjust the fluid pressure inside each of these chambers 112, 114 and thus adjust the position of the piston 110 between its retracted and deployed positions. It is also able to discharge control fluid coming from the first and second fluidic chambers 112, 114 into the return line 136.

The main tank 133 is configured to collect depressurized control fluid coming from the return line 136. It supplies the pressure generator 130.

The backup circuit 134 is able to supply the first fluidic chamber 112 with control fluid so as to move the piston 110 towards its deployed position in case of failure of the pressure generator 130. For this purpose, the backup circuit 134 comprises an auxiliary tank 137 and an auxiliary pump 138. In the example represented, it also comprises an auxiliary pressure relief valve 139B.

The auxiliary tank 137 is configured to collect depressurized control fluid coming from the return line 136. It supplies the auxiliary pump 138. In the example represented, it also supplies the main tank 133, the depressurized control fluid coming from the return line 136 passing through the auxiliary tank 137 before reaching the main tank 133.

The auxiliary pump 138 is able to pump the control fluid into the auxiliary tank 137 to bring it to the third pressure. It is fluidly connected to the pressure control unit 132 so as to supply it with control fluid at the third pressure, the pressure control unit 132 being configured to redirect the entire control fluid coming from the auxiliary pump 138 towards the first fluidic chamber 112.

The pressure relief valve 139B is able to discharge part of the control fluid towards the return line 136 when the pressure of the control fluid downstream of the auxiliary pump 138 exceeds the third pressure.

The control module 135 is configured to receive a setting instruction (not represented) and deduce therefrom a control signal transmitted to the pressure control unit 132. In particular, the control module 135 is configured to transmit to the pressure control unit 132 a control signal intended to increase the fluid pressure in the first chamber 112 when the setting instruction aims to increase the pitch of the blades 56, and to transmit to the pressure control unit 132 a control signal intended to increase the fluid pressure in the second chamber 114 when the setting instruction aims to reduce the pitch of the blades 56.

The control module 135 is also configured to transmit to the backup circuit 134, more particularly to its auxiliary pump 138, a start-up instruction in case of failure of the pressure generator 130.

The link system 78 links the moving part 102 to each blade 56 so as to convert the translation of the moving part 102 along the longitudinal axis X and, where appropriate, the rotation of the moving part 102 about the longitudinal axis X into a rotation of each blade 56 about its pivot axis P. In particular, the link system 78 links the moving part 102 to each blade 56 so as to convert:

the translation of the moving part 102 along the longitudinal axis X in a first way into a rotation of the variable-setting blade 56 about the pivot axis P towards the flat position, and the translation of the moving part 102 along the longitudinal axis X in a second direction opposite to the first way into a rotation of the variable-setting blade 56 about the pivot axis P towards the feather position.

For this purpose, the link system 78 comprises a synchronization ring 140 secured to the moving part 102 and, for each of the blades 56, a mechanism 142 for linking the blade 56 to the synchronization ring 140.

The synchronization ring 140 extends in a radial plane around the moving part 102. It is in particular fixed to an upstream end 143 of the moving part 102.

Each link mechanism 142 comprises a first articulation 144 secured to the moving part 102, a second articulation 146 secured to the blade 56, away from the pivot axis P of said blade 56, and a link member 148 linking the first articulation 144 to the second articulation 146.

The first articulation 144 is carried by the synchronization ring 140. It is here constituted by a ball joint connection.

The second articulation 146 is also constituted by a ball joint connection. It is eccentric relative to the pivot axis P.

The link member 148 has a first end 150 articulated to the first articulation 144 and a second end 152 articulated to the second articulation 146. Advantageously, the link member 148 is rigid and of adjustable length, that is to say the distance between the first and second ends 150, 152 can be modified, which makes it possible to accurately adjust its length in the stationary state so as to allow the piloting of the setting angle of each blade 56 by the pitch change mechanism 70.

The link member 148 is here constituted by a connecting rod 153.

In the example represented, each link mechanism 142 also comprises a crank 154 linking the attachment piece 60 to the second articulation 146. This crank 154 is rigid and secured to the attachment piece 60. It extends at least partly along a direction orthogonal to the pivot axis P. It forms an arm for rotating the blade 56.

In the example represented in FIG. 3, the first way goes from upstream to downstream, that is to say the displacement of the moving member 102 towards the stopper 92 (in other words towards its retracted position) causes a rotation of each blade 56 towards its flat position, and the second way goes from downstream to upstream, that is to say the displacement of the moving member 102 away from the stopper 92 (in other words towards its deployed position) causes a rotation of each blade 56 towards its feather position. In addition, the first articulation 144 is disposed upstream of the second articulation 146.

For this purpose, the second articulation 146 is, as visible in FIG. 8, placed opposite to the trailing edge 57B relative to a plane Q orthogonal to the chord C and containing the pivot axis P.

This particular arrangement allows, when the pitch change mechanism 70 is immobilized, the natural loads of the blade 56 towards its flat position to make the link member 148 work in traction and not in compression. The risk of buckling of the link member 148 is therefore very low, so that it is possible to use a relatively weak link member 148 and thus to lighten the pitch change mechanism 70.

The pitch change mechanism 70 also comprises a pitch locking device 160 capable of blocking the translation of the moving part 102 of the control actuator 74 in the first way, that is to say here towards its retracted position.

This locking device 160 comprises a support member 162 and a screw-nut system 164.

The support member 162 is movable in translation relative to the frame 72 along the longitudinal axis X between an operating position, represented in FIGS. 3 to 7, and a locking position (not represented). The support member 162 moves from its operating position to its locking position by translation in the first way, that is to say, in the example represented in FIG. 3, by translation from upstream to downstream. In other words, the operating position of the support member 162 is disposed upstream of its locking position.

The support member 162 comprises a body 166 elongated along the longitudinal axis X and centered on the longitudinal axis X. Said body 166 has a first longitudinal end 168, in particular a downstream longitudinal end, engaged through the orifice 90 of the frame 72, and a second free longitudinal end 170. The body 166 is here solid.

The first longitudinal end 168 and the orifice 90 of the frame 72 together form a guide system 172 guiding the support member 162 relative to the frame 72. This guide system 172 is here disposed on a downstream side of the screw-nut system 164.

The support member 162 also comprises a sleeve 174 secured to the body 166 and arranged around the second longitudinal end 170 of the body 166.

The screw-nut system 164 comprises a screw 176 and a nut 178.

The screw 176 extends around the body 166 of the support member 162 and is coaxial with said body 166. It is secured in translation to the support member 162 and movably mounted in rotation about the longitudinal axis X relative to the support member 162. For this purpose, the screw 176 is assembled to the support member 162 by means of a bearing 180. This bearing 180 is here interposed between the sleeve 174 of the support member 162 and an end portion 182 of the screw 176, housed between the body 166 and the sleeve 174.

The screw 176 has a second longitudinal end portion 184 opposite to the end portion 182. This second longitudinal end portion 184 defines a radial abutment surface 186. This abutment surface 186 is at a distance from the frame 72 when the support member 162 is in the operating position and bearing against the stopper 92 of the frame 72 when the support member 162 is in the locking position.

Here, the second longitudinal end portion 184 flares from a threaded body 190 of the screw 176 to the abutment surface 186. Thus, the contact surface between the abutment surface 186 and the stopper 92 is increased, which increases the friction forces between the abutment surface 186 and the stopper 92 and allows better transmission of the braking and blocking forces.

The abutment surface 186 and the stopper 92 are each smooth here. As a variant (not represented), the abutment surface 186 and/or the stopper 92 have asperities, so as to further increase the friction forces between the abutment surface 186 and the stopper 92 and allow for even greater transmission of the forces.

The abutment surface 186 extends in particular substantially radially. It is oriented in the first way that is to say in the example represented in FIG. 3, downstream. Here, it is arranged at a downstream end of the screw 176.

The threaded body 190 extends from one of the end portions 182, 184 to the other. It has an outer thread 192 at its circumference.

The threaded body 190 and the nut 178 are housed inside the cylinder 94 of the frame 72.

The nut 178 is secured to the moving part 102 of the actuator 74 and coaxial with the screw 176. It cooperates with the screw 176 so that a translation of the nut 178 along the longitudinal axis X relative to the screw 176 causes the rotation of the screw 176 about the longitudinal axis X relative to the support member 162.

The nut 178 has an inner thread 194.

The screw-nut system 164 is in particular formed by a reversible satellite roller screw system 195. In a conventional manner, this satellite roller screw system 195 comprises, in addition to the screw 176 and to the nut 178, a plurality of rollers 196 interposed between the screw 176 and the nut 178, each roller 196 being elongated parallel to the longitudinal axis X.

Figure 9:
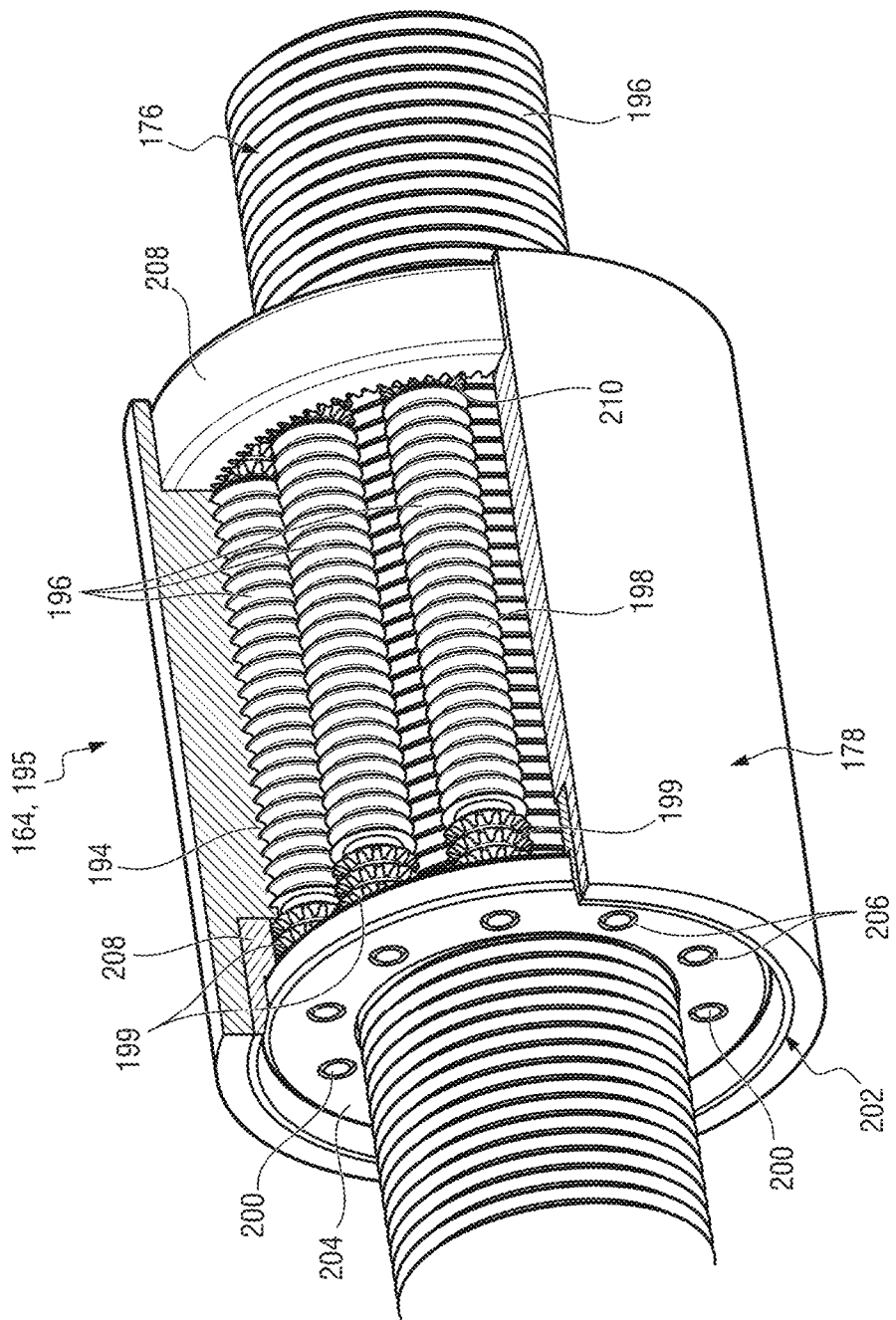
FIG. 9 is a perspective and partial sectional view of a satellite roller screw of the pitch change mechanism of FIG. 3.

As visible in FIG. 9, each roller 196 has a thread 198 engaged with the outer thread 192 of the screw 176 and the inner tapping 194 of the nut 176. It further comprises outer toothings 199 located at its ends and extended by smooth journals 200.

The satellite roller screw system 195 also has, still in a conventional manner, a device 202 for guiding and holding the rollers 196. This guide and holding device 202 comprises roller holders 204 (also called spacer bushings) which are mounted coaxially to the screw 176, between the latter and the nut 178, with notches 206 accommodating the journals 200 of the rollers 196. It also comprises a synchronization toothing 210 in which the outer toothings 198 located at the respective ends of the rollers 196 mesh. This meshing of the outer toothings 198 in the synchronization toothing 210 forms a planetary gear train whose role is to ensure synchronization of the satellite movement, also called planetary or epicyclic movement, of the rollers 196, thus smoothing the movement of the rollers 196 by helping them to roll easily, with the least possible slippage, on the thread 192 of the screw 176 and the tapping 194 of the nut 178.

In the example represented, the satellite roller screw system 195 is of the standard type, the rollers 196 being secured in translation to the nut 178. The synchronization toothing 210 is constituted by the inner toothing of rings 208 secured to the nut 178 and mounted respectively at each longitudinal end of the nut 178, the latter having a longitudinal extension substantially equal to that of the threaded portion of the rollers 196 and smaller than that of the threaded body 190 of the screw 176.

As a variant (not represented), the satellite roller screw system 195 is of the inverted type, the rollers 196 being secured in translation to the screw 176. The synchronization toothing 210 is then constituted by two outer toothings of the screw 176 at each longitudinal end of the threaded body 190, the latter having a longitudinal extension substantially equal to that of the threaded portion of the rollers 196 and smaller than that of the nut 178.

As a further variant, the satellite roller screw system 195 is constituted by a recirculating satellite roller screw system such as for example the one described in document EP 275 504 A2, or by a bearing roller screw system such as for example the one described in document EP 168 942 A1 or the one described in document EP 671 070 A1.

This characteristic allows for good transmission of the forces from the nut 178 to the screw 176 by the screw-nut system 164, while maintaining a small pitch in the helical link of the screw-nut system 164. In particular, in case of blocking of the rotation of the screw 176, it allows immobilizing the nut 178 relative to the screw 176 even in the absence of a distinct locking nut. It is thus possible to dispense with the use of a distinct locking nut, which simplifies the manufacture and reduces the costs of the mechanism, while increasing its reliability and minimizing its mass.

As a variant (not represented), the screw-nut system 164 is constituted by a screw-nut system similar to the one described in EP 1 832 509.

Returning to FIG. 3, the pitch locking device 160 is, in the example represented in this Figure, outside the fluidic chambers 112, 114 of the control actuator 74. This arrangement makes it possible to assemble to the frame 72 the pitch locking device 160 and the actuator 74 separately from each other, which facilitates the mounting of the pitch change mechanism 70 and thus reduces costs.

As seen in FIG. 3, part of the pitch locking device 160 even extends longitudinally away from the actuator 74. In other words, there is a radial plane beyond which part of the pitch locking device 160 extends without the actuator 74 extending beyond said radial plane. In particular, said part of the pitch locking device 160 extends upstream of the actuator 74.

To allow this arrangement, the pitch locking device 160 comprises a ferrule 193 linking the nut 178 to the moving part 102 of the actuator 74. This ferrule 193 here protrudes longitudinally towards the upstream from the control actuator 74. It is in particular frustoconical, its diameter decreasing from its downstream end 193A, attached to the actuator 74, to its upstream end 193B, attached to the nut 178.

In the example represented in FIG. 3, the pitch locking device 160 is also longitudinally cantilevered relative to the frame 72. In other words, the entire part of the frame 72 supporting the locking device 160 is located longitudinally on the same side, here downstream, of the locking device 160; the locking device 160 is not framed longitudinally by the part of the frame 72 supporting it. Thanks to this arrangement, the use of a support disposed upstream of the locking device 160 is avoided, which facilitates access to the pitch change mechanism 70 and more particularly to the link system 78.

Thus, the control actuator 74 is, in the example represented in FIG. 3, disposed longitudinally on the same side of the nut 178, here the downstream side, as the guide device 172 and the stopper 92.

To ensure good support of the locking device 160 despite this cantilever, the pitch change mechanism 70 comprises a device 220 for guiding the nut 178 relative to the frame 72. This guiding device 220 includes an inner cylinder 222 secured to the nut 178 and an outer cylinder 224 secured to the frame 72, the inner cylinder 222 cooperating with the outer cylinder 224 so as to slide longitudinally inside the latter.

The nut 178 is in particular mounted on an inner face 226 of the inner cylinder 222.

The inner cylinder 222 has an upstream end 228 to which the upstream end 193B of the ferrule 193 is fixed.

The outer cylinder 224 is here constituted by the cylinder 94 of the frame 72.

The pitch locking device 160 requires lubrication. For this purpose, the locking device 160 comprises a casing 230 at least partially defining an enclosure for circulation of a lubricating fluid for the pitch locking device 160. This casing 230 is secured to the nut 178 and surrounds the nut 178, the screw 176 and the support member 162.

In the examples of FIGS. 3, 4 and 6, the casing 230 comprises the inner cylinder 222 and a plug 232 closing one end of the inner cylinder 222 opposite to the frame 72, here the upstream end 228. The inner cylinder 222 has at its periphery a sealing 234 in contact with an inner face 236 of the outer cylinder 224. Thus, the outer cylinder 224 and the casing 230 together define an enclosure 238 for circulation of a lubricating fluid for the locking device 160. This enclosure 238 is fluidly isolated from the fluidic chambers 112, 114 of the actuator 74 by the sealing 234 and the upstream guide bushing 116. The sealing 234 and the guide bushing 116 thus form sealings of the pitch change mechanism 70 fluidly isolating the fluidic chambers 112, 114 of the actuator 74 from the pitch locking device 160.

Advantageously, the lubricating fluid for the locking device 160 consists of an oil. The pitch locking device 160 then comprises an accumulator (not represented) allowing the storage of the lubricating fluid when the actuator 74 is in the retracted position and the transfer of the lubricating fluid into the enclosure 238 when the actuator 74 moves to its deployed position. As a variant, the lubricating fluid for the locking device 160 consists of a grease deposited on the screw 176 and the rollings of the bearing 180.

In the example of FIG. 5, where the outer cylinder 224 and the upstream guide bushing 116 are absent, as well as in FIG. 7, where the inner cylinder 222 and the upstream guide bushing 116 are pierced, the casing 230 is constituted by the ferrule 193 and by a plug 239 closing the upstream end 193B of the ferrule 193. The first fluidic chamber 112 is then in fluid communication with the interior of the casing 230, the control fluid constituting the lubricating fluid for the locking device 160.

This variant makes it possible to dispense with the use of an accumulator. However, it requires a pump 130 with a higher flow rate than in the variant of FIGS. 3, 4 and 6.

The locking device 160 also comprises a biasing device 240 biasing the support member 162 towards its locking position and a holding device 242 for holding the support member 162 in its operating position when the pitch change mechanism 70 is in normal operating conditions.

The biasing device 240 is here constituted by a compression spring compressed between the frame 72 and a shoulder 244 secured to the support member 162. It is in particular housed in the cavity 86, between the shoulder 244 and the orifice 90.

The holding device 242 comprises a counterbalancing actuator 250 including a counterbalancing piston 252 and a counterbalancing chamber 254.

The counterbalancing piston 252 is movably mounted in translation along the longitudinal axis X relative to the frame 72. It is in particular coaxial with the support member 162. In the example represented, it is arranged in the longitudinal extension of the support member 162, between the support member 162 and the counterbalancing chamber 254.

The counterbalancing chamber 254 is defined between the counterbalancing piston 252 and the frame 72. In particular, the counterbalancing chamber 254 is defined between the counterbalancing piston 252 and a bottom 255 of the cavity 86 opposite to the orifice 90; the guide system 172, the biasing device 240 and the holding device 250 are thus all disposed longitudinally on the same side, here the downstream side, of the screw-nut system 164 and therefore in particular of the nut 178.

The counterbalancing chamber 254 is fluidly connected to the pressure generator 130 by a fluid connection circuit 256 so as to be supplied with control fluid at the third pressure.

It is intended to counterbalance the biasing of the biasing device 240 when this supply is active.

For this purpose, the counterbalancing actuator 250 is arranged so that the pressure exerted on the piston 252 by the fluid contained in the chamber 254 is oriented in a direction opposite to that of the biasing of the biasing device 250: in the example represented, the counterbalancing piston 252 is interposed between the chamber 254 and the shoulder 244 and the shoulder 244 is interposed between the piston 252 and the biasing device 240. In addition, the counterbalancing piston 252 and the counterbalancing chamber 254 are dimensioned so that, when the chamber 254 is supplied with control fluid at the third pressure, the force exerted by the control fluid on the piston 252 is greater than the biasing of the biasing device 240.

Thus, when the supply of the chamber 254 with control fluid at the third pressure is active, the biasing of the biasing device 240 is cancelled and the support member 162 is held in the operating position.

In the example represented, the pressure control unit 132 is fluidly interposed between the pressure generator 130 and the fluid connection circuit 256. It has a first configuration, in which it isolates the fluid connection circuit 256 from the return line 136, and a second configuration, in which it fluidly connects the fluid connection circuit 256 to the return line 136.

The pressure control unit 132 is configured to be normally in its first configuration and to switch to its second configuration upon receipt of a control instruction transmitted by the control module 135.

A method for changing the pitch of the blades 56, implemented by the pitch change mechanism 70 according to the first embodiment, will now be described.

During a first step of this method, the control module 135 first receives a setting instruction aiming to increase the pitch of the blades 56. The control module 135 then transmits to the pressure control unit 132 a control signal intended to increase the fluid pressure in the first chamber 112. As the fluid pressure in the first chamber 112 increases, the moving part 102 of the actuator 74 moves in the second direction, towards its deployed position which, via the link system 78, causes the pivoting of the blades 56 towards the large pitches (that is to say towards the feather position).

Once the moving part 102 has reached an equilibrium position, it stabilizes, the blades 56 maintaining a fixed orientation.

During a second step of the pitch change method, the control module 135 first receives a setting instruction aiming to reduce the pitch of the blades 56. The control module 135 then transmits to the pressure control unit 132 a control signal intended to increase the fluid pressure in the second chamber 114. As the fluid pressure in the second chamber 114 increases, the moving part 102 of the actuator 74 moves in the first way towards its retracted position which, via the link system 78, causes the pivoting of the blades 56 towards the small pitches (that is to say towards the flat position).

Once the moving part 102 has reached an equilibrium position, it stabilizes, with the blades 56 maintaining a fixed orientation.

Optionally, the pitch change method also comprises, following the first or the second step, a step of locking in a controlled manner the orientation of the blades 56.

During this step, the control module 135 transmits a pitch locking control to the pressure control unit 132. Under the effect of this control, the pressure control unit 132 fluidly connects the fluid connection circuit 256 to the return line 136, causing a fluid pressure drop in the counterbalancing chamber 254. The fluid pressure in said chamber 254 is then insufficient to counterbalance the biasing of the biasing device 240, which thus causes the displacement of the support member 162 towards its locking position.

During this displacement, the screw 176, while translating, rotates about the longitudinal axis X under the effect of the resistance imposed by the assembly of the nut 178 and the rollers 194 (which are kept immovable in translation by the control actuator 74) until its abutment surface 186 bears against the stopper 92 of the frame 72, blocking the rotation of the screw 176 about the longitudinal axis X and its translation along the same axis X.

The blades 56 are thus blocked in their orientation even in case of loss of fluid pressure in the first chamber 112.

In case of loss of pressure in the second chamber 114 only, the moving part 102 of the actuator 74 is moved in the second way under the effect of the pressure difference between the two chambers 112, 114, driving with it the screw 176 and the support member 162, which returns to its operating position. The moving part 102 is therefore no longer immobilized and can continue to move in the second way until the blades 56 are in the feather position.

In case of malfunction of the piloting system 76, typically in case of failure of the pressure generator 130, the pitch change method comprises an additional step of locking in a non-controlled manner the orientation of the blades 56.

During this step, the malfunction of the piloting system 76 causes a fluid pressure drop in the counterbalancing chamber 254, typically because the pressure generator 130 is no longer able to bring the control fluid to the third pressure. The fluid pressure in said chamber 254 is then insufficient to counterbalance the biasing of the biasing device 240, which thus causes the displacement of the support member 162 towards its locking position.

During this displacement, the screw 176 drives with it the nut 178 and the rollers 194, which are no longer held immovable in translation due to the loss of power to the control actuator 74. The blades 56 therefore pivot slightly towards the small pitches, until the abutment surface 186 of the screw 176 bears against the stopper 92 of the frame 72, blocking the rotation of the screw 176 about the longitudinal axis X and its translation along the same axis X.

The pivoting of the blades 56 towards the small pitches is then prevented by the locking device 160.

The non-controlled locking step is followed by a step of securing the fan 50. During this step, the backup circuit 134 is activated and supplies the first fluidic chamber 112 with control fluid so as to increase the fluid pressure in this chamber. Under the effect of this pressure increase, the moving part 102 moves in the second way, driving with it the screw 176 and the support member 162, which returns to its operating position. The moving part 102 is therefore no longer immobilized and can continue to move downstream until the blades 56 are in the feather position.

It will be noted that these different steps can be implemented independently of each other.

A second embodiment of the pitch change mechanism 70 will now be described, with reference to FIG. 10.

In this embodiment, the pitch change mechanism 70 comprises a frame 272, a control actuator 274, a system 276 for piloting the actuator 274 and a link system 278.

The frame 272 is secured to the hub 55 and is typically constituted by part of the hub 55. It is thus fixed relative to the pivot axes P.

In the example represented, the frame 272 comprises an upstream assembly 280 and a downstream assembly 282 spaced from each other along the longitudinal axis X. Each of these assemblies 280, 282 is centered on the longitudinal axis X and extends from the longitudinal axis X to the housing 62, the upstream assembly 280 being disposed upstream of the housing 62 and the downstream assembly 282 being disposed downstream of the housing 62.

The upstream assembly 280 is in particular formed by an upstream flange 284 in the general shape of a dome housing a blind cylinder 286 in its center. The blind cylinder 286 is closed at its upstream end 288 and open at its downstream end 289. It protrudes towards the upstream relative to the flange 284.

The upstream assembly 280 has in its center an orifice 290 opening out towards the downstream. This orifice 290 is in particular arranged in the upstream end 288 of the blind cylinder 286. The upstream assembly 280 also has a stopper 291 oriented downstream. This stopper 291 is here formed in the downstream face of the upstream end 288 of the blind cylinder 286. It extends substantially radially and is in particular arranged around the orifice 290.

Here, the downstream assembly 282 comprises a downstream flange 292 housing in its center two concentric cylinders 294, 296: a central cylinder 294, closed at its upstream end 298, and a peripheral cylinder 296 surrounding the central cylinder 294 and defining with the central cylinder 294 a peripheral cavity 300 closed at its downstream end 302. The central cylinder 294 defines a housing 304 in which an oil transfer bearing 306 is received.

Figure 10:
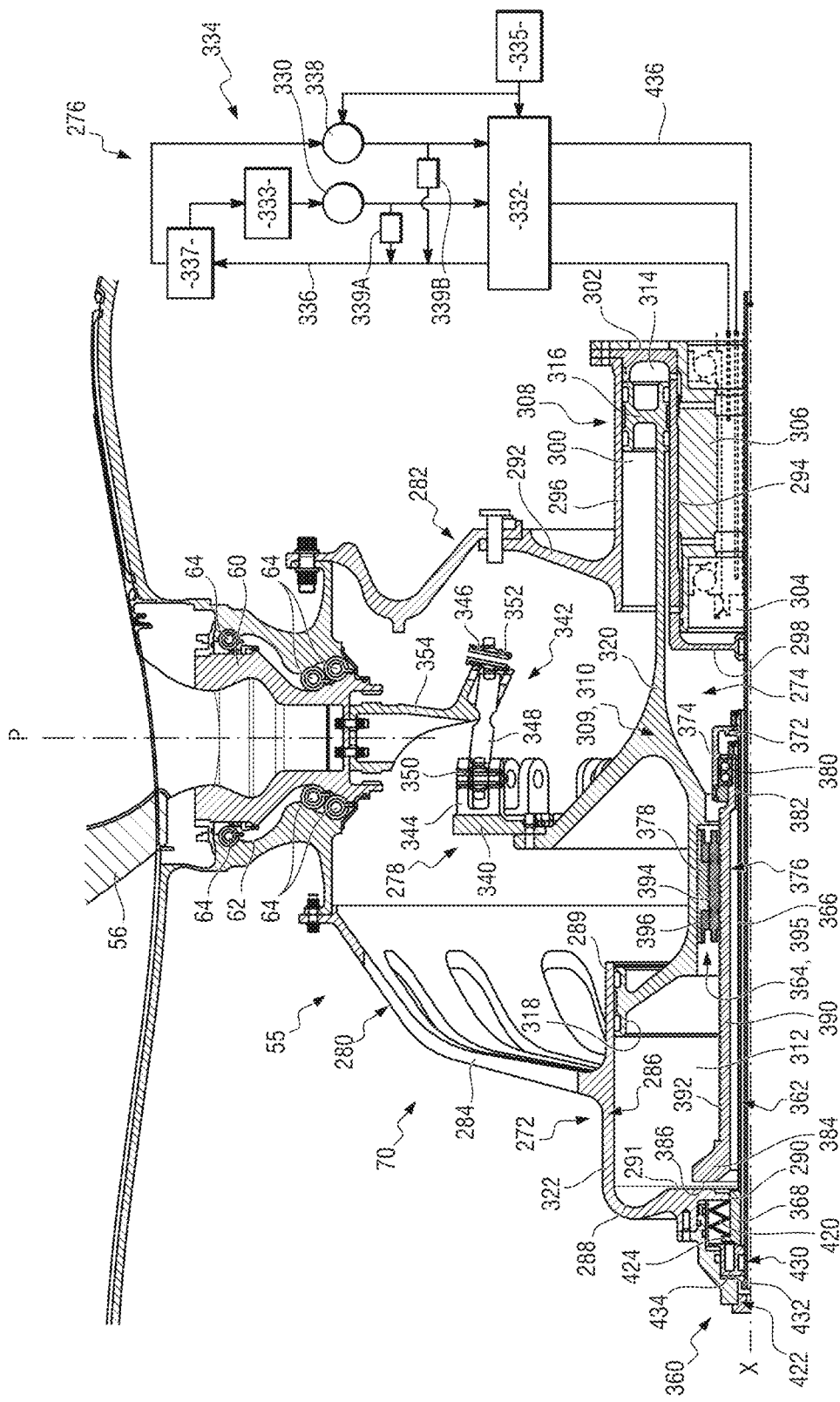
FIG. 10 is a simplified longitudinal sectional view of part of a pitch change mechanism of the turbomachine of FIG. 2 according to a second embodiment.

The control actuator 274 includes a fixed part 308, secured to the frame 72, and a moving part 309 movable in translation along the longitudinal axis X relative to the fixed part 308 between a retracted position, represented in FIG. 10, and a deployed position (not represented). Optionally, the moving part 309 is also movable in rotation about the longitudinal axis X over a restricted angle, for example of the order of 5°.

The control actuator 274 comprises in particular a piston 310 forming the moving part 309.

The control actuator 274 also comprises a first fluidic chamber 312 and a second fluidic chamber 314 each defined between the control piston 310 and the frame 272. Said fluidic chambers 312, 314 each contain a control fluid, typically constituted by an oil, which is at a first pressure in the first fluidic chamber 312 and at a second pressure in the second fluidic chamber 314. The first and second fluidic chambers 312, 314 are arranged such that the relative increase of the first pressure (that is to say relative to the second pressure) causes the displacement of the piston 310 towards its retracted position, the relative increase of the second pressure (that is to say relative to the first pressure) causing the displacement of the piston 310 towards its deployed position.

In the example represented, the piston 310 comprises a downstream sealing and guide bushing 316, an upstream sealing and guide bushing 318 and a cylindrical body 320 extending from the downstream sealing and guide bushing 316 to the upstream sealing and guide bushing 318. The downstream sealing and guide bushing 316 is housed in the peripheral cavity 300 and extends from the central cylinder 294 to the peripheral cylinder 296 by forming a sealing with each of these cylinders 294, 296. The upstream sealing and guide bushing 318 is housed in the blind cylinder 286 and forms a sealing with the peripheral wall 322 of the blind cylinder 286. The first fluidic chamber 312 is thus delimited at its downstream end by the downstream sealing and guide bushing 316, at its upstream end by the upstream end 288 of the blind cylinder 286, and at its periphery by the body 320 of the piston 310 and by the peripheral wall 322 of the blind cylinder 286. The second fluidic chamber 314 is for its part constituted by the portion of the peripheral cavity 300 comprised between the downstream sealing and guide bushing 316 and the downstream end 302 of said peripheral cavity 300.

The piloting system 276 comprises a pressure generator 330 for bringing the control fluid to a third pressure higher than the first and second pressures, a pressure control unit 332 for adjusting the pressure of the control fluid in the first and second fluidic chambers 312, 314 by means of the third pressure, and a return line 336 for discharging the depressurized control fluid. The piloting system 276 also comprises a main tank 333, a backup circuit 334 and a control module 335.

The pressure generator 330 comprises for example a pump able to pump the fluid to bring it to the third pressure, for example 100 bars. A main pressure relief valve 339A makes it possible to discharge part of the control fluid to the return line 336 when the pressure of the control fluid downstream of the pressure generator 330 exceeds the third pressure.

The pressure control unit 332 is supplied with control fluid at the third pressure by the pressure generator 330. It is fluidly connected to the first fluidic chamber 312 and to the second fluidic chamber 314 via the oil transfer bearing 306. It is able to distribute the control fluid between the first fluidic chamber 312 and the second fluidic chamber 314 so as to adjust the fluid pressure inside each of these chambers 312, 314 and thus adjust the position of the piston 310 between its retracted and deployed positions. It is also able to discharge control fluid coming from the first and second fluidic chambers 312, 314 into the return line 336.

The main tank 333 is configured to collect depressurized control fluid coming from the return line 336. It supplies the pressure generator 330.

The backup circuit 334 is able to supply the second fluidic chamber 314 with control fluid so as to move the piston 310 to its retracted position in case of failure of the pressure generator 330. For this purpose, the backup circuit 334 comprises an auxiliary tank 337 and an auxiliary pump 338. In the example represented, it also comprises an auxiliary pressure relief valve 339B.

The auxiliary tank 337 is configured to collect depressurized control fluid coming from the return line 336. It supplies the auxiliary pump 338. In the example represented, it also supplies the main tank 333, the depressurized control fluid coming from the return line 336 passing through the auxiliary tank 337 before reaching the main tank 333.

The auxiliary pump 338 is able to pump the control fluid into the auxiliary tank 337 to bring it to the third pressure. It is fluidly connected to the pressure control unit 332 so as to supply it with control fluid at the third pressure, the pressure control unit 332 being configured to redirect the entire control fluid coming from the auxiliary pump 338 towards the second fluidic chamber 314.

The pressure relief valve 339B is able to discharge part of the control fluid towards the return line 336 when the pressure of the control fluid downstream of the auxiliary pump 338 exceeds the third pressure.

The control module 335 is configured to receive a setting instruction (not represented) and deduce therefrom a control signal transmitted to the pressure control unit 332. In particular, the control module 335 is configured to transmit to the pressure control unit 332 a control signal intended to increase the fluid pressure in the second chamber 314 when the setting instruction aims to increase the pitch of the blades 56, and to transmit to the pressure control unit 332 a control signal intended to increase the fluid pressure in the first chamber 312 when the setting instruction aims to reduce the pitch of the blades 56.

The control module 335 is also configured to transmit to the backup circuit 334, more particularly to its auxiliary pump 338, a start-up instruction in case of failure of the pressure generator 330.

The link system 278 links the piston 310 to each blade 56 so as to convert the translation of the piston 310 along the longitudinal axis X and, where appropriate, the rotation of the piston 310 about the longitudinal axis X into a rotation of each blade 56 about its pivot axis P.

For this purpose, the link system 278 comprises a synchronization ring 340 secured to the piston 310 and, for each of the blades 56, a mechanism 342 for linking the blade 56 to the synchronization ring 340.

The synchronization ring 340 extends in a radial plane around the piston 310.

Each link mechanism 342 comprises a first articulation 344 secured to the piston 310, a second articulation 346 secured to the blade 56, away from the pivot axis P of said blade 56, and a connecting rod 348 linking the first articulation 344 to the second articulation 346.

The first articulation 344 is carried by the synchronization ring 340. It is here constituted by a ball joint connection.

The second articulation 346 is also constituted by a ball joint connection. It is eccentric relative to the pivot axis P.

The connecting rod 348 has a first end 350 articulated to the first articulation 344 and a second end 352 articulated to the second articulation 346. Advantageously, the connecting rod 348 is of adjustable length, that is to say the distance between the first and second ends 350, 352 can be modified, which makes it possible to accurately adjust the piloting of the setting angle of each blade 56 by the pitch change mechanism 70.

In the example represented, each link mechanism 342 also comprises an eccentric piece 354 linking the attachment piece 60 to the second articulation 346.

The link system 278 is arranged so that the displacement of the piston 310 towards the stopper 291, that is to say towards its deployed position, causes a rotation of each blade 56 towards its flat position, and that the displacement of the piston 310 away from the stopper 291, that is to say towards its retracted position, causes a rotation of each blade 56 towards its feather position. For this purpose, the second articulation 346 is placed, relative to the plane Q orthogonal to the chord C and containing the pivot axis P, on the side of the trailing edge 57B, that is to say opposite, relative to the pivot axis P, to the position occupied by the second articulation 146 in the embodiment of FIGS. 4 to 9.

It will be noted that, in the example represented in FIG. 10, the first articulation 344 is disposed upstream of the second articulation 346. This has the consequence that, when the pitch change mechanism 70 is immobilized, the natural loads of the blade 56 towards its flat position cause the link member 348 to work in compression, involving a risk of buckling of said link member 348. To avoid this risk of buckling of the link member 348 and to be able to use a lighter link member 348, a variant (not represented) in which the first articulation 344 is disposed downstream of the second articulation 346 will therefore be preferred. This particular arrangement indeed allows, like that of the first embodiment, that the natural loads of the blade 56 towards its flat position make the link member 348 work in traction and not in compression when the pitch change mechanism 70 is immobilized.

The pitch change mechanism 70 also comprises a pitch locking device 360 capable of blocking the translation of the piston 310 relative to the frame 272 towards its deployed position.

This locking device 360 comprises a support member 362 and a screw-nut system 364.

The support member 362 is movable in translation relative to the frame 272 along the longitudinal axis X between an operating position, represented in FIG. 10, and a locking position (not represented).

The support member 362 comprises a body 366 elongated along the longitudinal axis X and centered on the longitudinal axis X. Said body 366 has a first longitudinal end 368, in particular an upstream longitudinal end, engaged through the orifice 290 of the frame 272, and a second free longitudinal end 372. Moreover, in the example represented, the body 366 is hollow and is open at its two longitudinal ends 368, 372.

The support member 362 also comprises a sleeve 374 secured to the body 366 and arranged around the second longitudinal end 372 of the body 366.

The screw-nut system 364 comprises a screw 376 and a nut 378.

The screw 376 extends around the body 366 of the support member 362 and is coaxial with said body 366. It is secured in translation to the support member 362 and movably mounted in rotation about the longitudinal axis X relative to the support member 362. For this purpose, the screw 376 is assembled to the support member 362 by means of a bearing 380. This bearing 380 is here interposed between the sleeve 374 of the support member 362 and an end portion 382 of the screw 376, housed between the body 366 and the sleeve 374.

The screw 376 has a second longitudinal end portion 384 opposite to the end portion 382. This second longitudinal end portion 384 defines a radial abutment surface 386. This abutment surface 386 is at a distance from the frame 272 when the support member 362 is in the operating position and bearing against the stopper 291 of the frame 272 when the support member 362 is in the locking position.

Here, the second longitudinal end portion 384 flares from a threaded body 390 of the screw 376 to the abutment surface 386. Thus, the contact surface between the abutment surface 386 and the stopper 291 is increased, which increases the friction forces between the abutment surface 386 and the stopper 291 and allows better transmission of the braking and locking forces.

The abutment surface 386 and the stopper 291 are each smooth here. As a variant (not represented), the abutment surface 386 and/or the stopper 291 have asperities, so as to further increase the friction forces between the abutment surface 386 and the stopper 291 and allow for an even greater transmission of the forces.

The threaded body 390 extends from one of the end portions 382, 384 to the other. It has an outer thread 392 at its periphery.

The nut 378 is secured to the piston 310 and coaxial with the screw 376. It cooperates with the screw 376 so that a translation of the nut 378 along the longitudinal axis X relative to the screw 376 causes the rotation of the screw 376 about the longitudinal axis X relative to the support member 362.

The nut 378 has an inner thread 394.

The screw-nut system 364 is in particular formed by a reversible satellite roller screw system 395. Conventionally, this satellite roller screw system 395 comprises, in addition to the screw 376 and to the nut 378, a plurality of rollers 396 interposed between the screw 376 and the nut 378, each roller 396 being elongated parallel to the longitudinal axis X.

Preferably, the description given above of the satellite roller screw system 195 applies mutatis mutandis to the satellite roller screw system 395.

This characteristic allows for a good transmission of the forces from the nut 378 to the screw 376 by the screw-nut system 364, while maintaining a small pitch in the helical link of the screw-nut system 364. In particular, in case of blocking of the rotation of the screw 376, it allows immobilizing the nut 378 relative to the screw 376 even in the absence of a distinct locking nut. It is thus possible to dispense with the use of a distinct locking nut, which simplifies the manufacture and reduces the costs of the mechanism, while increasing its reliability and minimizing its mass.

The locking device 360 also comprises a biasing device 420 biasing the support member 362 towards its locking position and a holding device 422 for holding the support member 362 in its operating position when the pitch change mechanism 70 is in normal operating conditions.

The biasing device 420 is here constituted by a compression spring compressed between the frame 272 and a shoulder 424 secured to the support member 362.

The holding device 422 comprises a counterbalancing actuator 430 including a counterbalancing piston 432 and a counterbalancing chamber 434.

The counterbalancing piston 432 is secured to the support member 362. It is movably mounted in translation along the longitudinal axis X relative to the frame 272. It is in particular coaxial with the support member 362. In the example represented, it is arranged in the longitudinal extension of the support member 362.

The counterbalancing piston 432 and the frame 272 together define the chamber 434.

The counterbalancing chamber 434 is fluidly connected to the pressure generator 330 by a fluid connection circuit 436 so as to be supplied with control fluid at the third pressure. It is intended to counterbalance the biasing of the biasing device 420 when this supply is active.

For this purpose, the counterbalancing actuator 430 is arranged so that the pressure exerted on the piston 432 by the fluid contained in the chamber 434 is oriented in a direction opposite to that of the biasing of the biasing device 420: in the example represented, the counterbalancing piston 432 is interposed between the chamber 434 and the shoulder 424 and the shoulder 424 is interposed between the piston 432 and the biasing device 420. In addition, the counterbalancing piston 432 and the counterbalancing chamber 434 are dimensioned so that, when the chamber 434 is supplied with control fluid at the third pressure, the force exerted by the control fluid on the piston 432 is greater than the biasing of the biasing device 420.

Thus, when the supply of the chamber 434 with control fluid at the third pressure is active, the biasing of the biasing device 420 is canceled and the support member 362 is held in the operating position.

In the example represented, the pressure control unit 332 is fluidly interposed between the pressure generator 330 and the fluid connection circuit 436. It has a first configuration, in which it isolates the fluid connection circuit 436 from the return line 336, and a second configuration, in which it fluidly connects the fluid connection circuit 436 to the return line 336.

The pressure control unit 332 is configured to be normally in its first configuration and to switch to its second configuration upon receipt of a control instruction transmitted by the control module 335.

A method for changing the pitch of the blades 56, implemented by the pitch change mechanism 70 according to the second embodiment, will now be described.

During a first step of this method, the control module 335 first receives a setting instruction aiming to increase the pitch of the blades 56. The control module 335 then transmits to the pressure control unit 332 a control signal intended to increase the fluid pressure in the first chamber 312. As the fluid pressure in the first chamber 312 increases, the control piston 310 moves towards its retracted position which, via the link system 278, causes the pivoting of the blades 56 towards the large pitches (that is to say, towards the feather position).

Once the piston 310 has reached an equilibrium position, it stabilizes, with the blades 56 maintaining a fixed orientation.

During a second step of the pitch change method, the control module 335 first receives a setting instruction aiming to reduce the pitch of the blades 56. The control module 335 then transmits to the pressure control unit 332 a control signal intended to increase the fluid pressure in the second chamber 314. As the fluid pressure in the second chamber 314 increases, the control piston 310 moves to its deployed position which, via the link system 278, causes the pivoting of the blades 56 towards the small pitches (that is to say towards the flat position).

Once the piston 310 has reached an equilibrium position, it stabilizes, with the blades 56 maintaining a fixed orientation.

Optionally, the pitch change method also comprises, following the first or the second step, a step of locking in a controlled manner the orientation of the blades 56.

During this step, the control module 335 transmits a pitch locking control to the pressure control unit 332. Under the effect of this control, the pressure control unit 332 fluidly connects the fluid connection circuit 436 to the return line 336, causing a fluid pressure drop in the counterbalancing chamber 434. The fluid pressure in said chamber 434 is then insufficient to counterbalance the biasing of the biasing device 420, which thus causes the displacement of the support member 362 towards its locking position.

During this displacement, the screw 376 rotates about the longitudinal axis X under the effect of the resistance imposed by the assembly of the nut 378 and of the rollers 394 (which are kept immovable in translation by the control actuator 274) until its abutment surface 386 bears against the stopper 291 of the frame 272, blocking the rotation of the screw 376 about the longitudinal axis X and its translation along the same axis X.

The blades 56 are thus blocked in their orientation even in case of loss of fluid pressure in the first chamber 312.

In case of pressure loss in the second chamber 314 only, the piston 310 is moved towards its retracted position under the effect of the pressure difference between the two chambers 312, 314, driving with it the screw 376 and the support member 362, which returns to its operating position. The piston 310 is therefore no longer immobilized and can continue to move towards its retracted position until the blades 56 are in the feather position.

In case of a malfunction of the piloting system 276, typically in case of failure of the pressure generator 330, the pitch change method comprises an additional step of locking in a non controlled manner the orientation of the blades 56.

During this step, the malfunction of the piloting system 276 causes a fluid pressure drop in the counterbalancing chamber 434, typically because the pressure generator 330 is no longer able to bring the control fluid to the third pressure. The fluid pressure in said chamber 434 is then insufficient to counterbalance the biasing of the biasing device 420, which thus causes the displacement of the support member 362 towards its locking position.

During this displacement, the screw 376 drives with it the nut 378 and the rollers 394, which are no longer held immovable in translation due to the loss of power to the control actuator 274. The blades 56 therefore pivot slightly towards the small pitches, until the abutment surface 386 of the screw 376 bears against the stopper 291 of the frame 272, blocking the rotation of the screw 376 about the longitudinal axis X and its translation along the same axis X.

The pivoting of the blades 56 towards the small pitches is then prevented by the locking device 360.

The non-controlled locking step is followed by a step of securing the fan 50. During this step, the backup circuit 334 is activated and supplies the first fluidic chamber 312 with control fluid so as to increase the fluid pressure in this chamber. Under the effect of this pressure increase, the piston 310 moves towards its retracted position, driving with it the screw 376 and the support member 362, which returns to its operating position. The piston 310 is therefore no longer immobilized and can continue to move downstream until the blades 56 are in the feather position.

It should be noted that these different steps can be implemented independently of each other.

Thus, thanks to the exemplary embodiments described above, it is possible to dispense with the use of a locking nut distinct from the nut 178, 378 of the screw-nut system 164, 364. This results in a locking device 160, 360 and, as a result, a pitch change mechanism 70 whose manufacture is simplified, costs are reduced and reliability is increased.

Moreover, the exemplary embodiments of FIGS. 3 to 9 make it possible to lighten the pitch change mechanism 70 thanks to the compactness of the control actuator 74 and to the use of less resistant and therefore lighter link members 148.

Said exemplary embodiments of FIGS. 3 to 9 also make it possible to avoid using a support disposed upstream of the locking device 160, which facilitates access to the pitch change mechanism 70, and more particularly to the link system 78, once it is assembled.

These exemplary embodiments of FIGS. 3 to 9 finally allow great accuracy in piloting the setting angle of the blades 56, which authorizes on the hub 55 the close implantation of large blades 56 with complex geometry, thus making it possible to increase the efficiency of the turbomachine 12.

The invention claimed is:

1. A pitch change mechanism for adjusting an angular position of at least one variable-setting blade about a pivot axis of the variable-setting blade, said pitch change mechanism comprising:
a frame fixed relative to the pivot axis,
a control actuator including a fixed part secured to the frame and a moving part movable in translation along a longitudinal axis relative to the fixed part,
a link system linking the moving part to the variable-setting blade so as to convert a translation of the moving part relative to the fixed part along the longitudinal axis into a rotation of the variable-setting blade about the pivot axis, and a pitch locking device capable of blocking the translation of the moving part relative to the fixed part in at least one way, the pitch locking device comprising:

a support member, movable in translation relative to the frame along the longitudinal axis between an operating position and a locking position, a biasing device biasing the support member towards its locking position, a holding device for holding the support member in its operating position under normal operating conditions, and a screw-nut system with:

a screw secured in translation to the support member and movably mounted in rotation about the longitudinal axis relative to the support member, the screw having an abutment surface which is at a distance from the frame when the support member is in the operating position and bearing against the frame when the support member is in the locking position, and a nut secured to the moving part and coaxial with the screw, the nut cooperating with the screw so that a translation of the nut along the longitudinal axis causes rotation of the screw about the longitudinal axis, wherein the screw-nut system is formed by a satellite roller screw system.

2. The pitch change mechanism according to claim 1, wherein the link system comprises a first articulation secured to the moving part, a second articulation secured to the variable-setting blade, away from the pivot axis, and a link member linking the first articulation to the second articulation.

3. The pitch change mechanism according to claim 2, wherein the first articulation is disposed upstream, respectively downstream, of the second articulation, the first way going from upstream to downstream, respectively from downstream to upstream.

4. The pitch change mechanism according to claim 2, wherein the variable-setting blade comprises a leading edge, a trailing edge and a chord linking the leading edge to the trailing edge, the second articulation being placed opposite to the trailing edge relative to a plane orthogonal to the chord and containing the pivot axis.

5. The pitch change mechanism according to claim 1, wherein the longitudinal axis is substantially orthogonal to the pivot axis.

6. The pitch change mechanism according to claim 1, wherein the satellite roller screw system is reversible.

7. The pitch change mechanism according to claim 1, wherein the control actuator comprises a first chamber containing a control fluid at a first pressure and a second chamber containing the control fluid at a second pressure, the pitch change mechanism comprises a pressure generator for bringing the control fluid to a third pressure higher than the first and second pressures and a pressure control unit for adjusting the first and second pressures by means of the third pressure, and the holding device comprises a counterbalancing actuator including a chamber supplied with control fluid at the third pressure to counterbalance the biasing of the biasing device.

8. The pitch change mechanism according to claim 1, wherein the frame comprises a stopper against which the abutment surface of the screw bears when the support member is in the locking position, the variable-setting blade is movable about its pivot axis between a flat position and a feather position, and the link system is configured so that a displacement of the moving part towards the stopper causes a rotation of the variable-setting blade towards the flat position.

9. The pitch change mechanism according to claim 1, wherein the satellite roller screw system comprises a plurality of rollers interposed between the screw and the nut, each roller being engaged with an outer thread of the screw and an inner tapping of the nut.

10. The pitch change mechanism according to claim 9, wherein each roller is secured in translation to the nut or to the screw.

11. The pitch change mechanism according to claim 1, wherein the satellite roller screw system is constituted by a recirculating satellite roller screw system or a satellite roller bearing screw system.

12. The pitch change mechanism according to claim 1, wherein the pitch locking device comprises a casing secured to the nut and surrounding the nut, the screw and the support member.

13. The pitch change mechanism according to claim 12, wherein the casing at least partially defines an enclosure for circulation of a lubricating fluid for the pitch locking device.

14. A fan rotor for a turbomachine comprising a hub and a plurality of variable-setting blades each pivotable relative to the hub about a specific pivot axis, the rotor further comprising the pitch change mechanism according to claim 1 for adjusting an angular position of each of the variable-setting blades about its respective pivot axis.

15. The fan rotor according to claim 14, wherein the link system of the pitch change mechanism comprises, for each of the variable-setting blades, a first articulation secured to the moving part, a second articulation secured to the variable-setting blade, away from the pivot axis, and a connecting rod linking the first articulation to the second articulation.

16. The fan rotor according to claim 14, wherein the longitudinal axis constitutes an axis of rotation of the fan rotor.

17. A turbomachine comprising the fan rotor according to claim 14.

18. An aircraft comprising the turbomachine according to claim 17.

19. A method for changing a pitch of blades of a fan rotor for a turbomachine, each pivotable relative to a hub of the fan rotor about a specific pivot axis, said method comprising adjusting an angular position of each of said blades about its respective pivot axis by means of the pitch change mechanism according to claim 1.

20. The method according to claim 19, comprising an additional step of locking the angular position of the blades by means of the pitch locking device.

* * * * *